(12) United States Patent
Sobel et al.

(10) Patent No.: US 9,007,331 B2
(45) Date of Patent: Apr. 14, 2015

(54) TOUCH SENSITIVE PANEL DETECTING HOVERING FINGER

(75) Inventors: David A. Sobel, Los Altos, CA (US); Monika Gupta, Irvine, CA (US); John Walley, Ladera Ranch, CA (US); Pieter Vorenkamp, Laguna Niguel, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 300 days.

(21) Appl. No.: 12/945,556

(22) Filed: Nov. 12, 2010

(65) Prior Publication Data

US 2011/0115742 A1   May 19, 2011

Related U.S. Application Data

(60) Provisional application No. 61/261,702, filed on Nov. 16, 2009.

(51) Int. Cl.
| | |
|---|---|
| G06F 3/045 | (2006.01) |
| G06F 3/041 | (2006.01) |
| G06F 3/033 | (2013.01) |
| G06F 21/32 | (2013.01) |

(52) U.S. Cl.
CPC ............... *G06F 3/033* (2013.01); *G06F 21/32* (2013.01)

(58) Field of Classification Search
CPC .......... G06F 3/041; G06F 2203/04101; G06F 2203/04108

USPC ................................. 345/173–178, 156–168; 178/18.01–18.06
See application file for complete search history.

(56) References Cited

U.S. PATENT DOCUMENTS

| | | | | |
|---|---|---|---|---|
| 2003/0064801 | A1* | 4/2003 | Breckner et al. ................. | 463/30 |
| 2006/0097991 | A1* | 5/2006 | Hotelling et al. ............. | 345/173 |
| 2006/0244733 | A1* | 11/2006 | Geaghan ....................... | 345/173 |
| 2007/0279397 | A1* | 12/2007 | Cho et al. ....................... | 345/173 |
| 2008/0012835 | A1* | 1/2008 | Rimon et al. .................. | 345/173 |
| 2010/0060596 | A1* | 3/2010 | Wight ............................ | 345/173 |
| 2011/0050618 | A1* | 3/2011 | Murphy et al. ............... | 345/174 |

* cited by examiner

*Primary Examiner* — Vijvay Shankar
*Assistant Examiner* — Amit Chatly
(74) *Attorney, Agent, or Firm* — Garlick & Markison; Kevin L. Smith

(57) ABSTRACT

A touch sensitive pad with a plurality of touch sensitive elements and processing circuitry coupled to a communications interface and to the touch sensitive pad for scanning the plurality of touch sensitive elements to measure a plurality of touch sensitive element values. The plurality of touch sensitive element values is compared to a hovering finger threshold pattern. Upon a favorable comparison, a hovering finger condition is determined, and a position of the hovering finger in three-dimensions is detected with respect to the touch sensitive pad. The plurality of touch sensitive element values is compared to a touching finger threshold pattern. Upon a favorable comparison, a touching finger condition is determined, and a position of the touching finger is detected upon the touch sensitive pad.

20 Claims, 24 Drawing Sheets

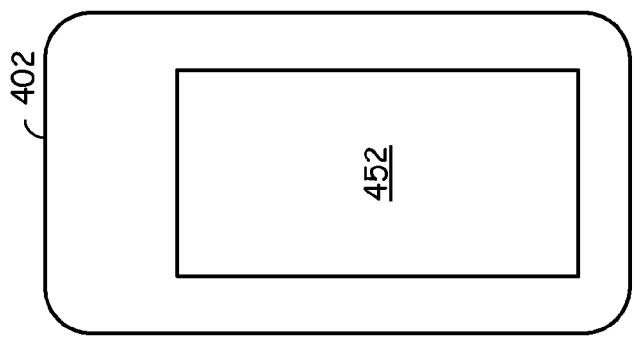
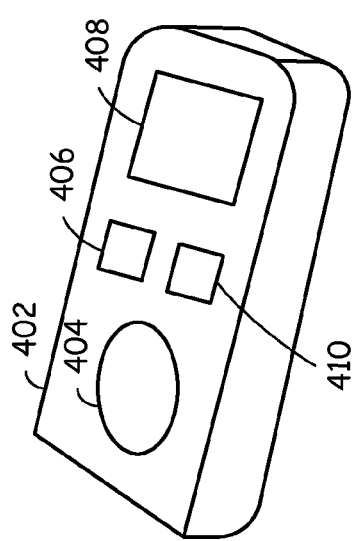

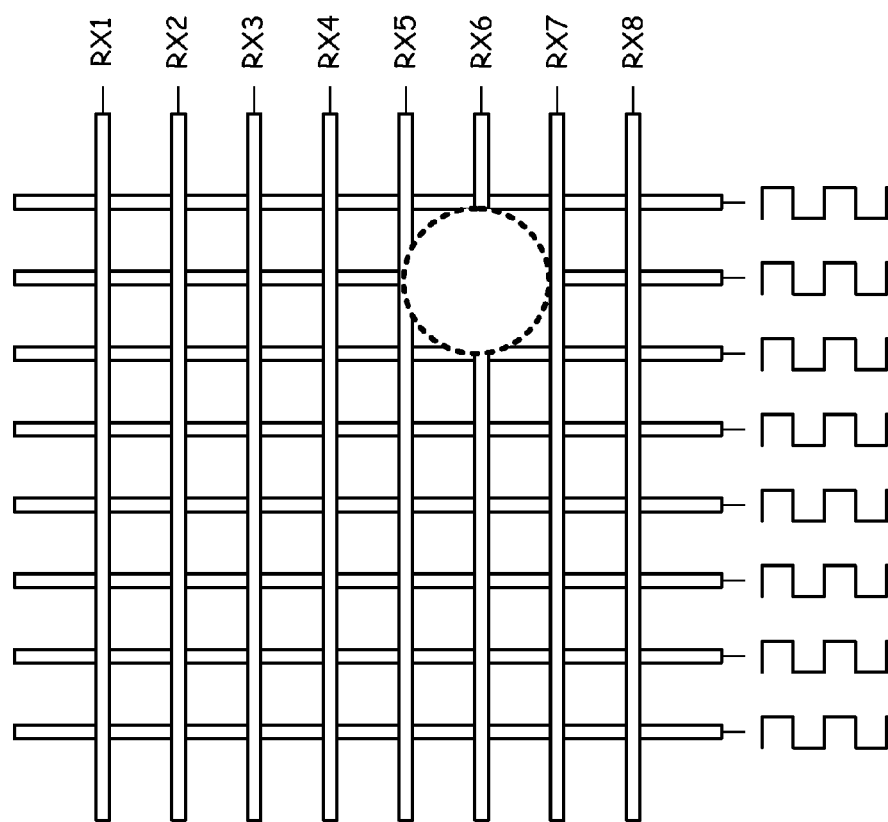

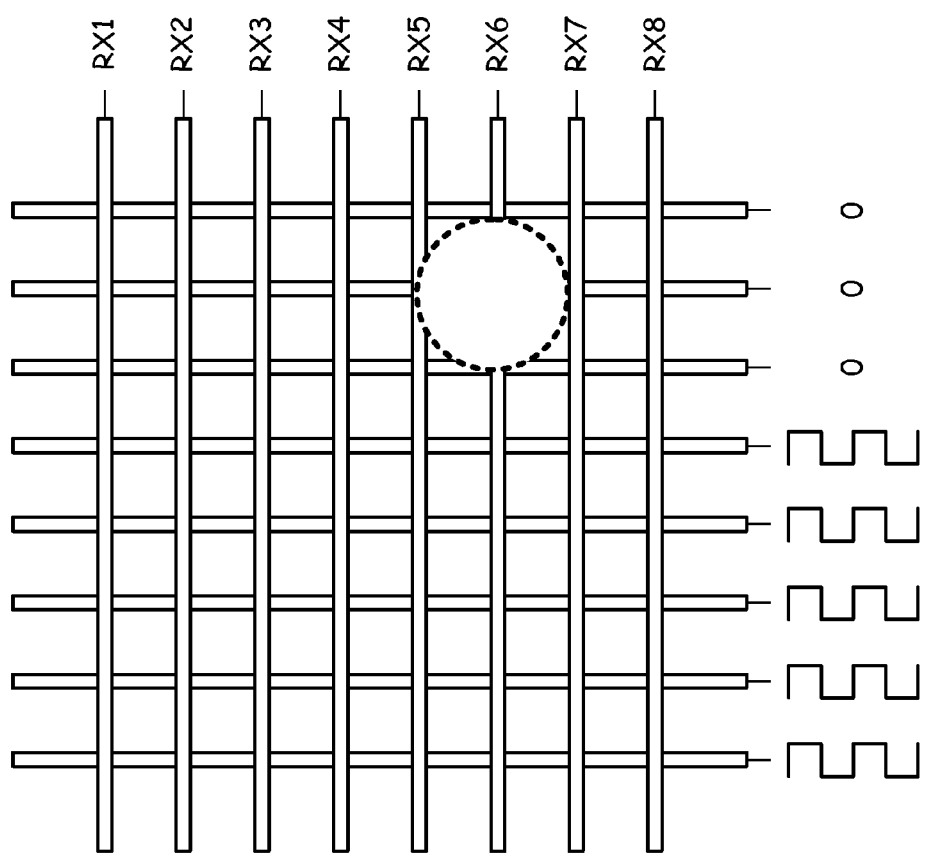

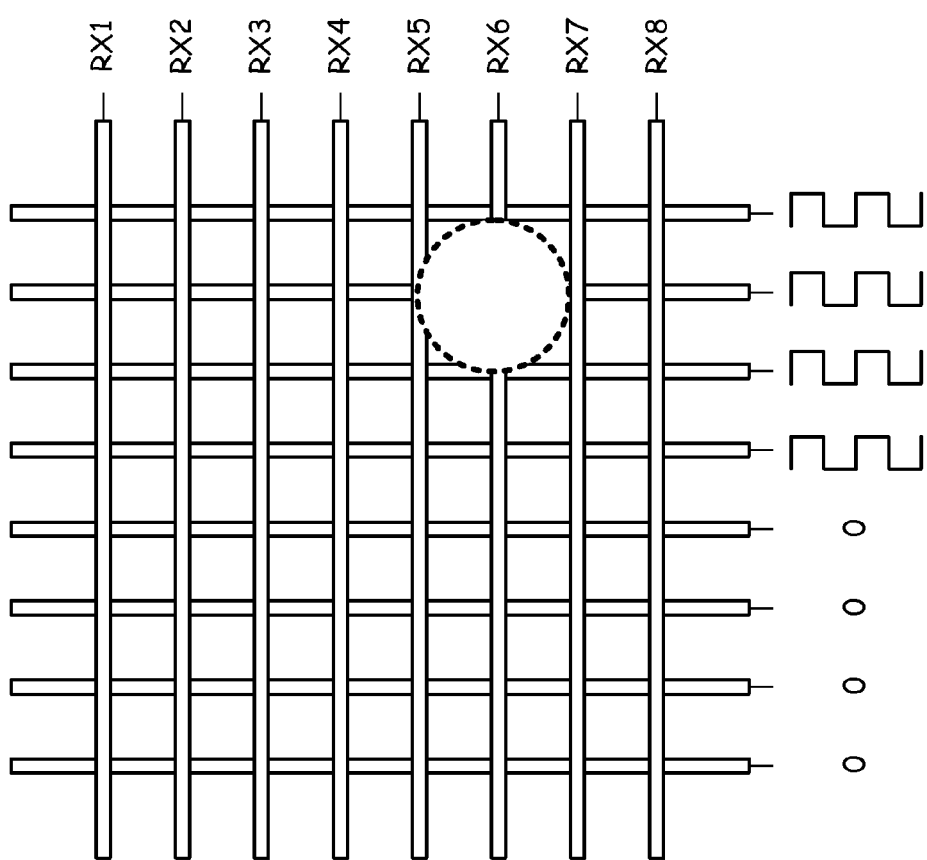

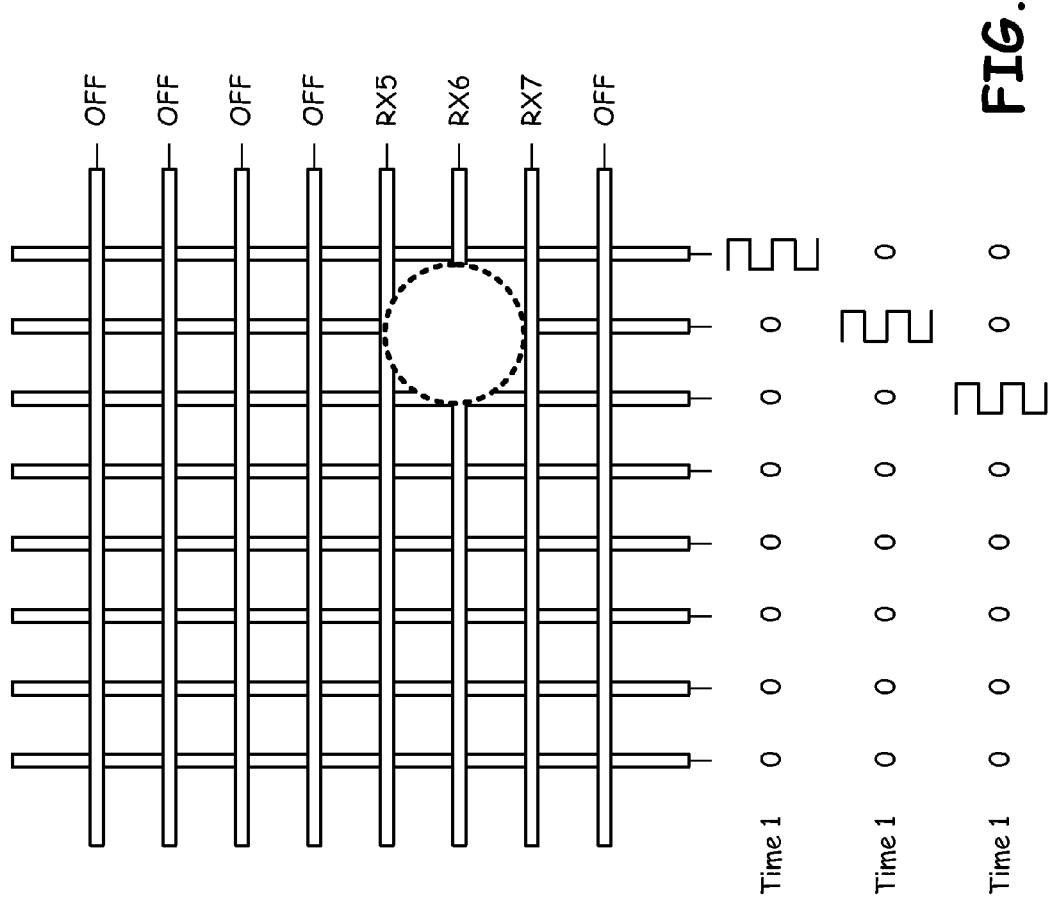

TOUCH SENSITIVE PANEL DETECTING HOVERING FINGER

CROSS-REFERENCE TO PRIORITY APPLICATION

The present U.S. Utility Patent Application claims priority pursuant to 35 U.S.C. §119(e) to the following U.S. Provisional Application which is hereby incorporated herein by reference in its entirety and made part of the present U.S. Utility Patent Application for all purposes:
1. U.S. Provisional Application Ser. No. 61/261,702, entitled "TOUCH PAD USER IDENTIFICATION, GAMING INPUT, AND PREFERENCE INPUT," filed Nov. 16, 2009.

BACKGROUND OF THE INVENTION

1. Field of the Invention

The present invention relates generally to electronic devices; and more particularly to electronic devices having touch sensitive pads/panels.

2. Description of the Related Art

User gaming devices are fairly well known. These devices include game consoles with communicatively coupled controllers such as Nintendo game consoles, Sony game consoles, Microsoft game consoles, and various other game console devices. These game consoles couple to a television, may couple to an audio system, and support user game playing. Some of these game consoles support wireless communications with handheld game controllers and/or other game controllers. For example, the Nintendo Wii includes handheld controllers that detect their orientation to some degree, acceleration to some degree, and receive standard button inputs from a user. This information is wirelessly relayed to the game controller to control operation of corresponding game elements within the gaming environment. Other game controllers may include simulated game pieces such as musical instruments, baseball bats, golf clubs, and various other types of simulated devices.

With the continued advancement of technology, the complexities and capabilities of game consoles have become advanced. The game controllers support sophisticated gaming inputs received via numerous input sources, e.g., buttons, accelerometers, IR orientation detectors, positional detectors, and various other gaming inputs. The gaming environment in which these gaming inputs are received is very complex, providing a fairly realistic experience for a user of the gaming device/console. While some games supported by a game console may support only a few gaming inputs, other games require a large number of gaming inputs.

Most game consoles support many differing games, which are software controlled via respective software programming. Sometimes game controllers are specific to the particular game being supported, e.g., guitar hero, rock star, and various other particular types of games. In such a case, these various types of inputs must be supported by differing unique game controllers. The expense and complexity of the multiple game controllers can be overwhelming for some users from a cost standpoint.

Many gaming systems are contained within one unit such as the Nintendo Game Boy and its successors and the Sony Play Station and its successors, for example. These gaming systems include processing resources and a user interface contained within a single unit. With these units, various buttons receive user input while a display and speakers provide user output. Because of the limited battery life available for these units, their functionality has been limited in some regard.

Audio/video entertainment systems that include cable boxes, satellite boxes, and audio visual components typically include one or more remote control devices. These remote control devices allow users to remotely control system operation. Such technology is very old and has been prevalent for a number of years. However, one problem with these devices is that the operation generally of the set-top box is generic to all users and must be uniquely programmed if desired for a particular user. However, this particular programming in other settings is typically applied across the board to all potential users of the device.

BRIEF SUMMARY OF THE INVENTION

The present invention is directed to apparatus and methods of operation that are further described in the following Brief Description of the Drawings, the Detailed Description, and the claims. Other features and advantages of the present invention will become apparent from the following detailed description of the invention made with reference to the accompanying drawings.

BRIEF DESCRIPTION OF THE DRAWINGS

FIG. 4A is a first perspective view of a game controller constructed according to one or more embodiments of the present invention;

FIG. 4B is a second perspective view of the game controller of FIG. 3A that is constructed according to one or more embodiments of the present invention;

FIGS. 20A-C are diagrams illustrating detecting a hovering finger or touching finger using zone-based active scan operations of an embodiment of touch pad operations according to one or more embodiments of the present invention; and FIGS. 21A and 21B are diagrams illustrating detecting a hovering finger or touching finger using alternate zone-based active scan operations of an embodiment of touch pad operations according to one or more embodiments of the present invention.

DETAILED DESCRIPTION

Figure 1:
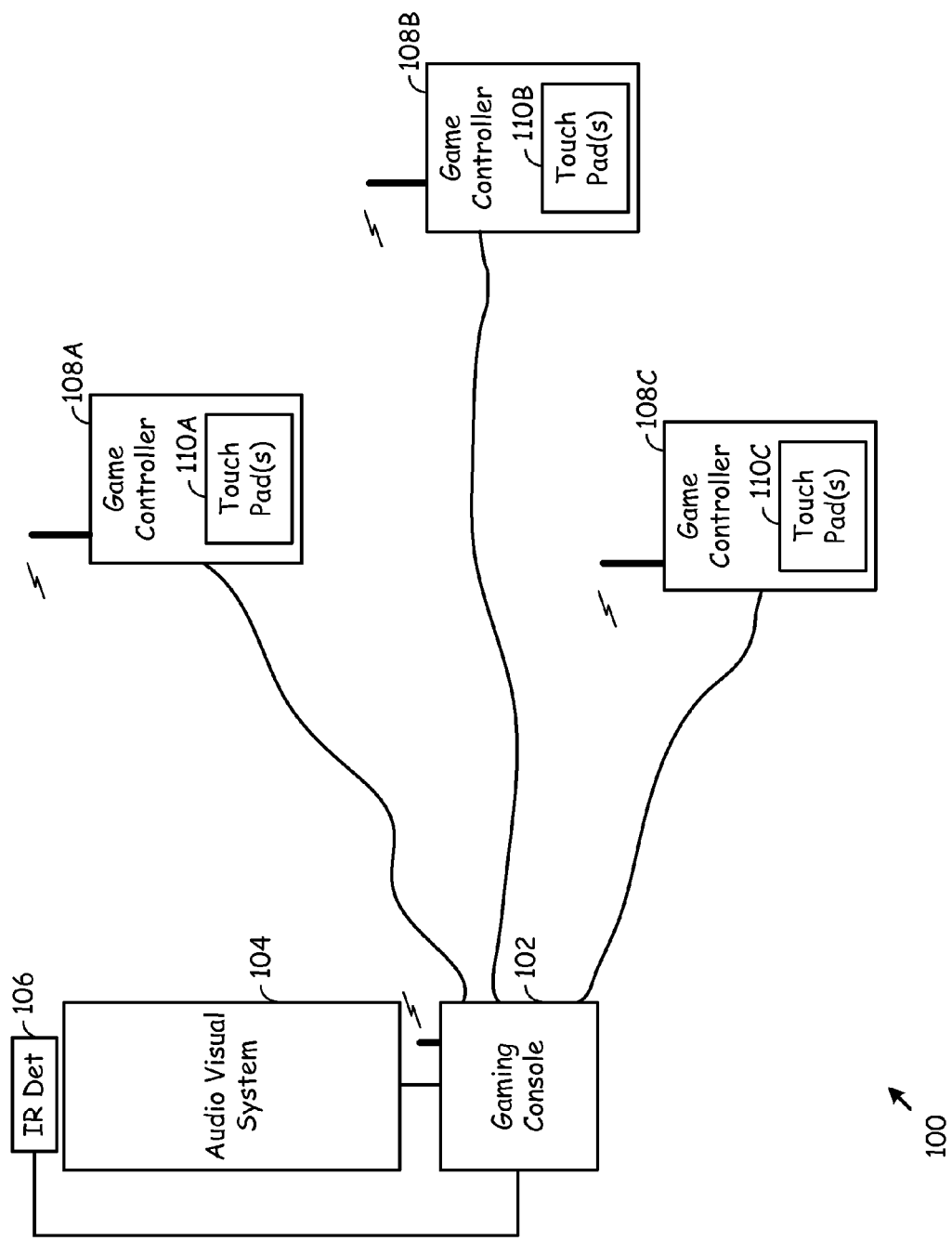
FIG. 1 is a system diagram illustrating a video game system constructed according to one or more embodiments of the present invention.

FIG. 1 is a system diagram illustrating a video game system constructed according to one or more embodiments of the present invention. The gaming system 100 of FIG. 1 includes a game console 102 and a plurality of game controllers 108A, 108B, and 108C. The game console 102 couples to an audio/visual system 104 that includes a video monitor and an audio system. The game console 102 also couples to an infrared (IR) detector 106.

The game controllers 108A, 108B, and 108C communicate with the game console 102 via one or more of a wired and/or wireless communication link. The wired communication link may be a tethered controller including conductors that support wired communications. Wireless communications may be in various RF frequency bands and/or in the infrared range. Thus, each of the game controllers 108A, 108B, and 108C includes communication circuitry that allow the game controllers 108A, 108B, and 108C to communicate with the game console 102.

According to one or more embodiments of the present invention, each of game controllers 108A, 108B, and 108C includes one or more touch sensitive pads/touch panels (referred to herein interchangeably) 110A, 110B, and 110C, respectively. According to some aspects of the present invention, the touch pads of the game controllers are used to identify users of the game controllers, to provide gaming input, to determine whether a user is active, and/or to provide other information to the game console 102 for subsequent action. Data captured by the touch pads may be solely processed by a host game controller, e.g., 108A, may be partially processed and transmitted to the game console 102 for further processing, or may be transferred in an unprocessed format from the game controller 108A to the game console 102. Based upon one or more embodiments of the present invention, touch pads are coupled to touch pad circuitry that measures capacitance (inductance or RF propagation) characteristics observed by a plurality of touch sensitive elements of the touch pads.

Figure 9:
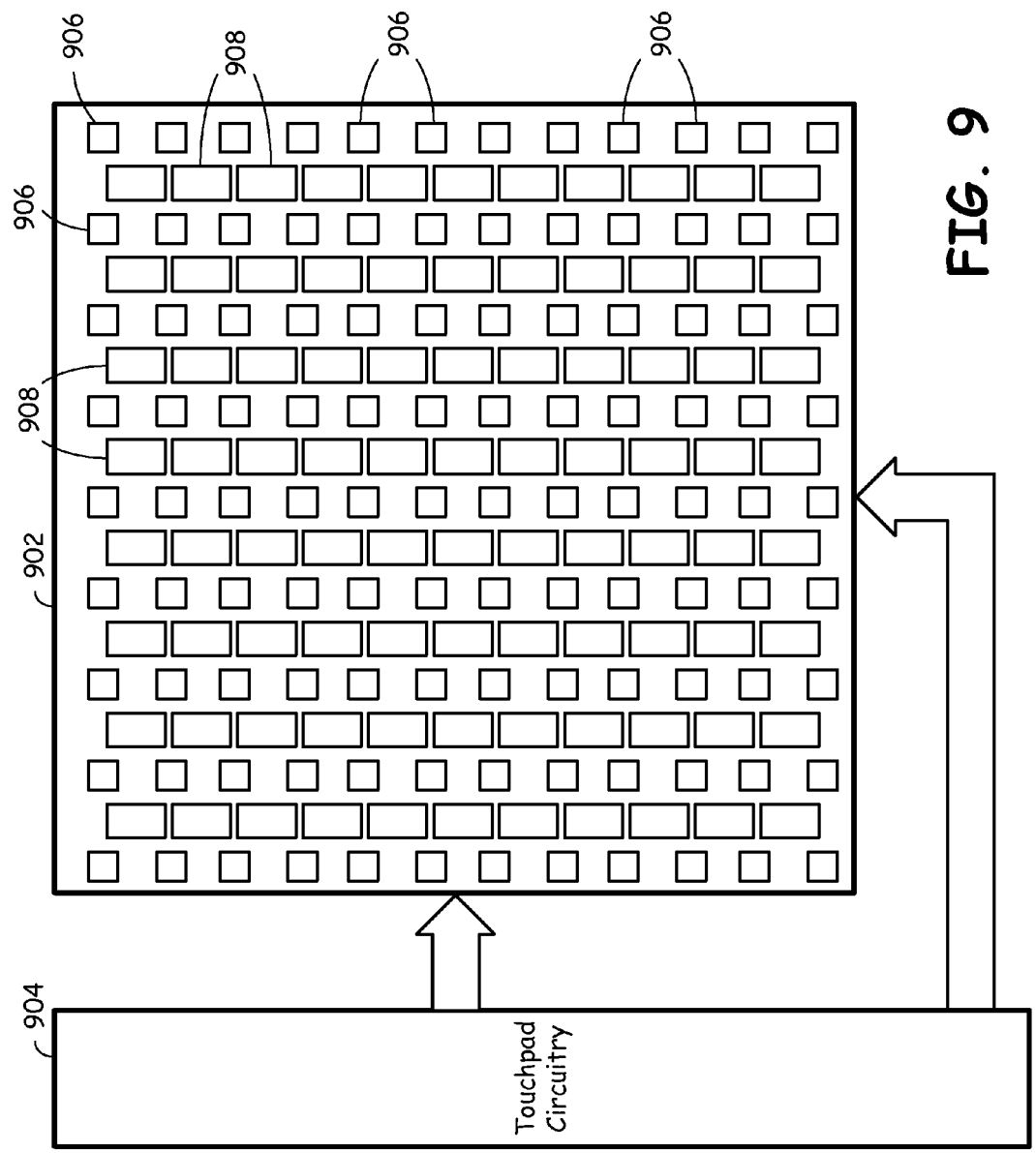
FIG. 9 is a block diagram illustrating a portion of a touch sensitive pad having touch sensitive elements that are not uniform and touch pad circuitry constructed according to one or more embodiments of the present invention.
Figure 10:
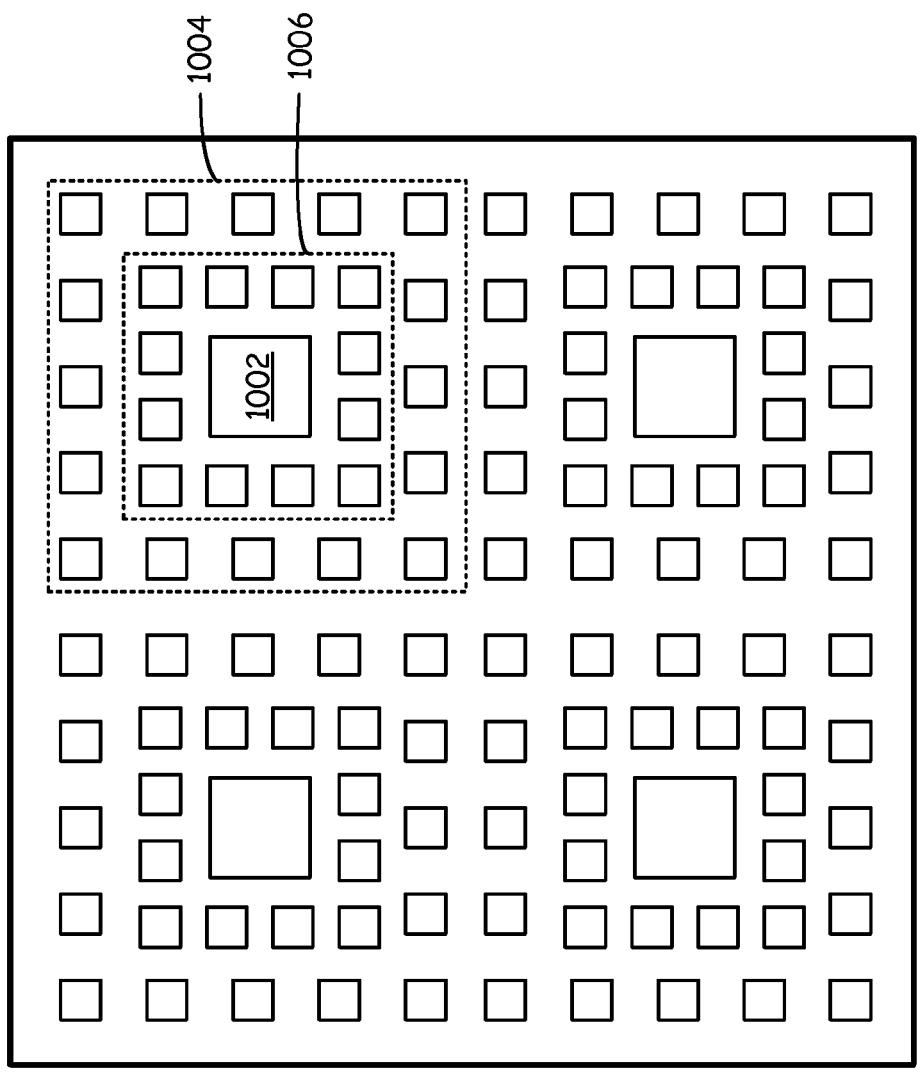
FIG. 10 is a block diagram illustrating a portion of a touch sensitive pad with central elements having one or more sets of touch sensitive elements constructed according to one or more embodiments of the present invention.
Figure 11:
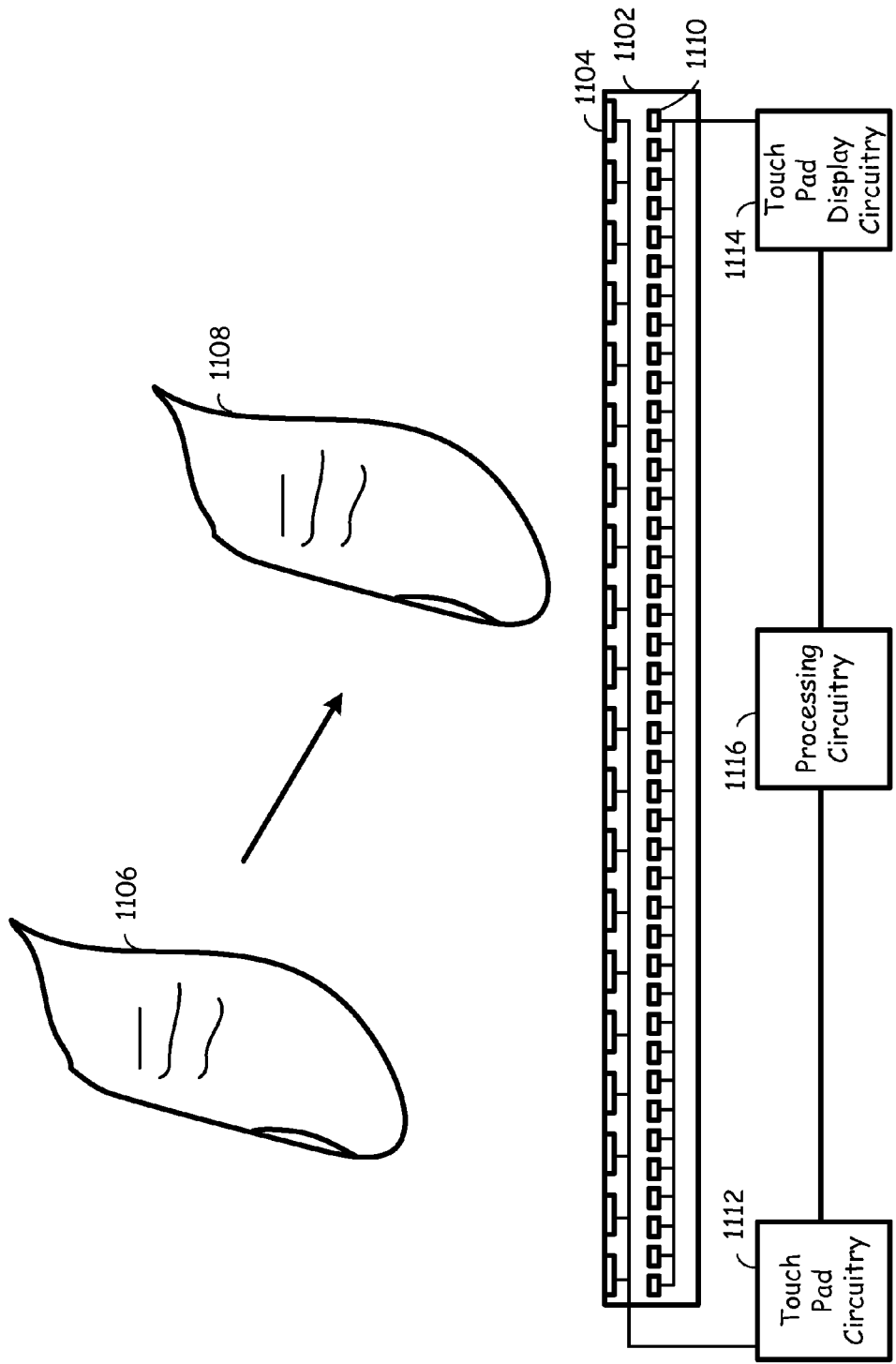
FIG. 11 is a diagrammatic side view illustrating the motion of a user's finger from one position to a second position while hovering above a touch pad constructed and operating according to one or more embodiments of the present invention.
Figure 12:
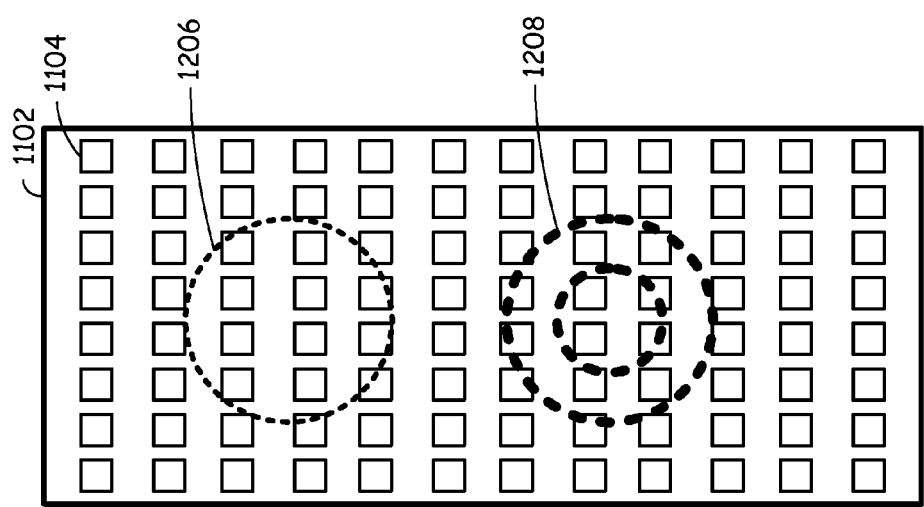
FIG. 12 is a diagram illustrating a touch pad and the manner in which a hovering finger may be detected via differing capacitance levels according to one or more embodiments of the present invention.
Figure 13:
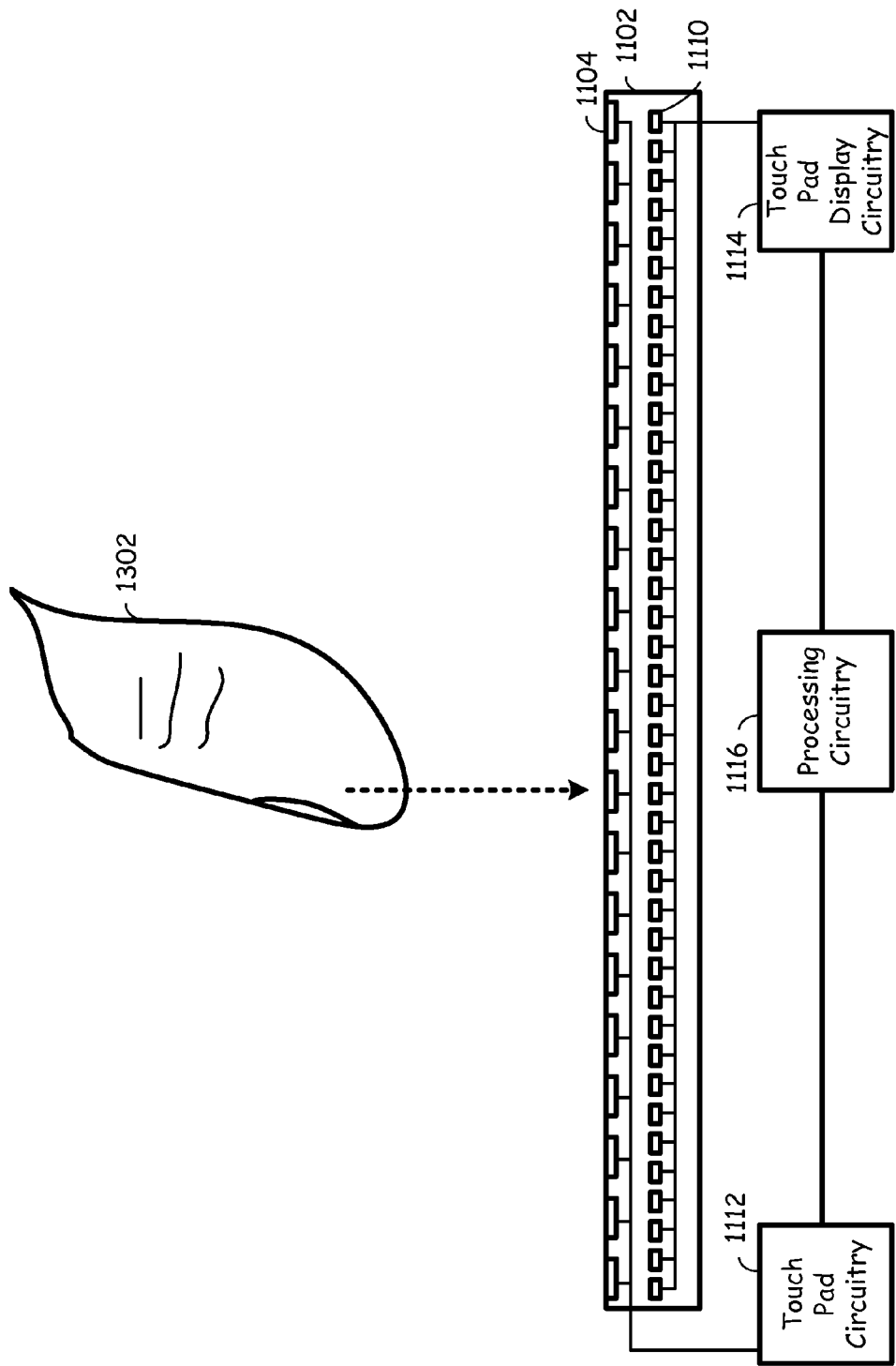
FIG. 13 is a diagrammatic side view illustrating the motion of a user's finger from one position downward while hovering above a touch pad according to one or more embodiments of the present invention.
Figure 14:
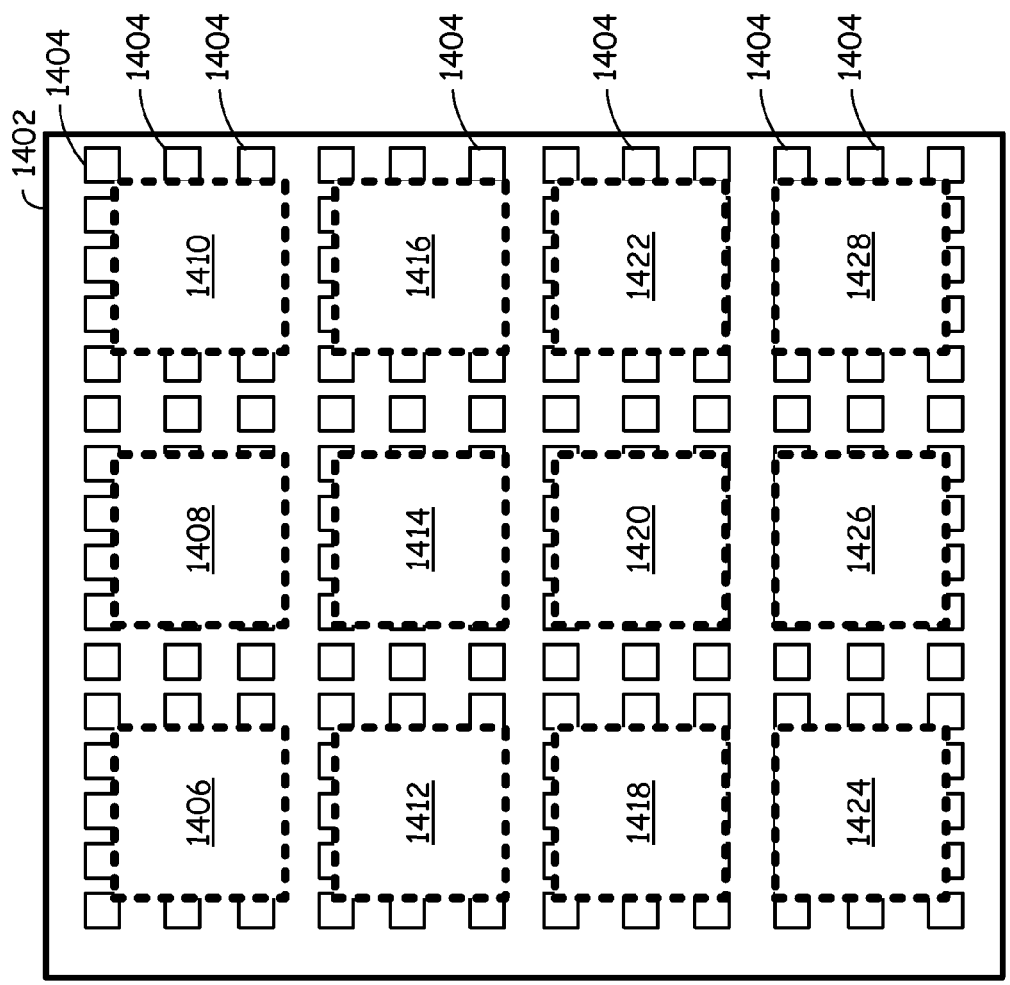
FIG. 14 is a diagram illustrating a touch pad and the manner in which a button icon of a corresponding touch pad display indicates varying depressions upon detection of a hovering finger according to one or more embodiments of the present invention.

Each of the touch pads 110A, 110B, and 110C can detect a hovering finger and interact with the gaming console 102 to provide a hovering finger position with respect to the touch pad, i.e., a hovering finger position in x, y, z Cartesian coordinates or coordinates in another reference frame that are respective to an origin located in three-dimensions fixed to the touch pad. The hovering finger input may be used as gaming input by a gaming console for a supported game being played, for game selection, for user ID operations, and/or for other input to a game. It is understood that touch pad input processing can occur in the gaming console 102, a game controller, e.g., 108A, or in a combination of both of these. FIGS. 9-11 describe structure and related operations for detection of and determination of the position of a hovering finger according to one or more embodiments of the present invention. FIGS. 12-14 illustrate partial and full button depression button indication based upon the position of a hovering finger with respect to a touch pad, the button depression indication providing feedback to a user (having the hovering finger).

The inventive concepts described herein may also be applied to/embodied by a single package video game, i.e., a video game system that is contained in a single housing, a single package telephone, a single package remote control, a single package computer, a computer touch pad display, or other single package device. Such single package system includes a display, a user input, which includes one or more touch pads, processing components, memory components, and powering components, such as a battery and power circuitry. Thus, the teachings of the present invention further apply to all forms of touch sensitive systems including touch sensitive panel computers, touch sensitive panel monitors, touch sensitive panel laptop computers, smart phones, etc.

Figure 2:
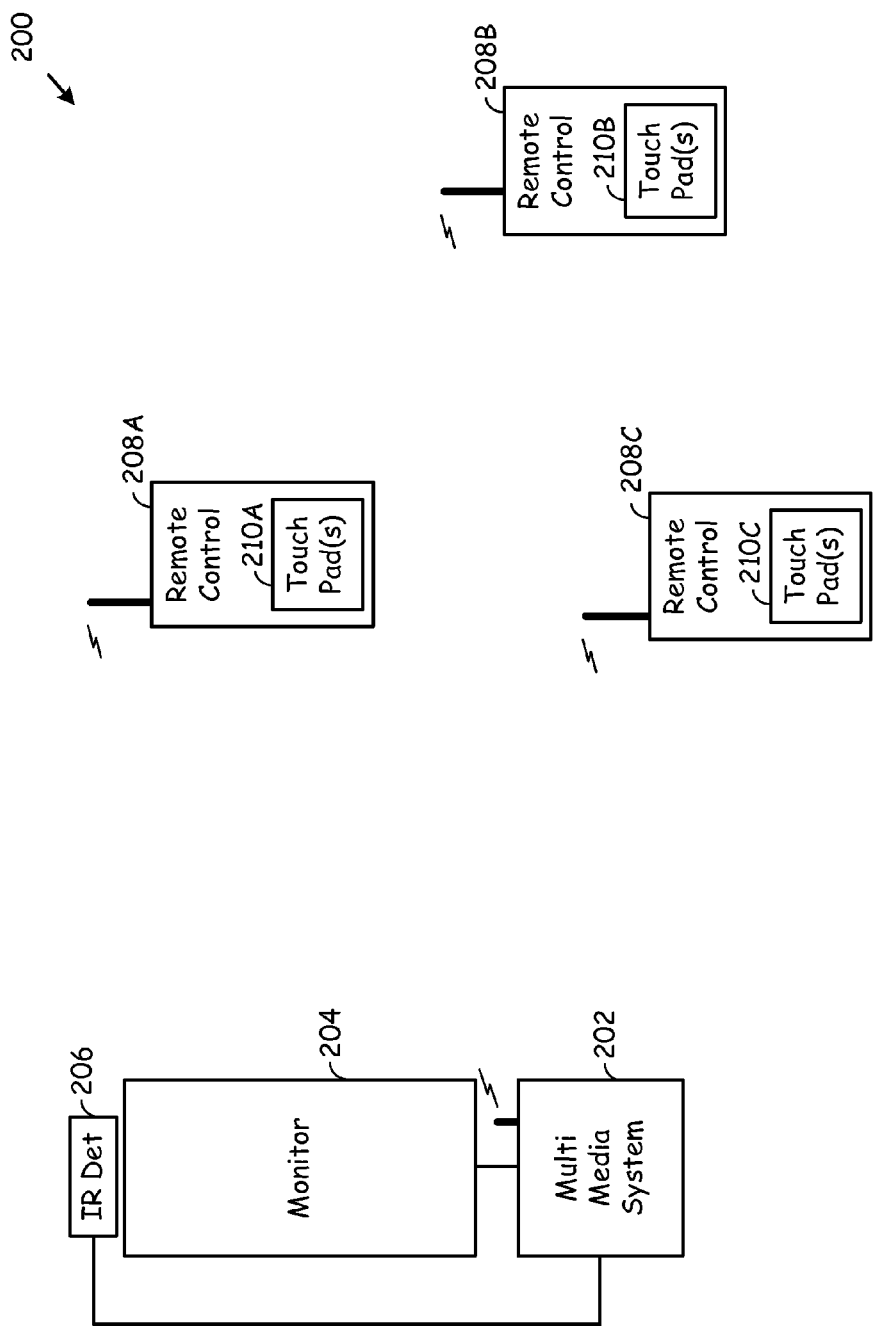
FIG. 2 is a system diagram illustrating an audio/video entertainment system constructed according to one or more embodiments of the present invention.

FIG. 2 is a system diagram illustrating an audio/video entertainment system constructed according to one or more embodiments of the present invention. The audio/video entertainment system 200 includes a multimedia system 202 that couples to monitor 204 and related multimedia system components such as speakers, audio components such as CD Players, DVD Players, tape deck, and/or various other multimedia system components. In some embodiments, the multimedia system 202, the monitor 204, and the IR detector 206 may be contained in single housing, e.g., stand-alone television, television with stereo, television with CD/DVD/tape deck, etc.

The multimedia system 202 also couples to an IR detector 206 or has such an IR detector built-in. The audio/video entertainment system 200 of FIG. 2 further includes at least one remote control 208A, 208B, and/or 208C. Each of these remote controls 208A, 208B, and 208C includes respective touch pads 210A, 210B, and 210C. The remote controls 208A, 208B, 208C support detection of a hovering finger above the touch pad and determine the position of such hovering finger, e.g., Cartesian coordinates (three dimensions) of the hovering finger with respect to the touch pad. The remote control 208A, 208B, 208C may relay the position of the hovering finger in three-dimensions back to the multimedia system 202. Touch pad input processing can occur in the multimedia system 202, the remote control 208A, or a combination of these. The hovering finger position detection may be employed as remote control input via interaction between a remote control, e.g., 208A, and the multimedia system 204.

Figure 3:
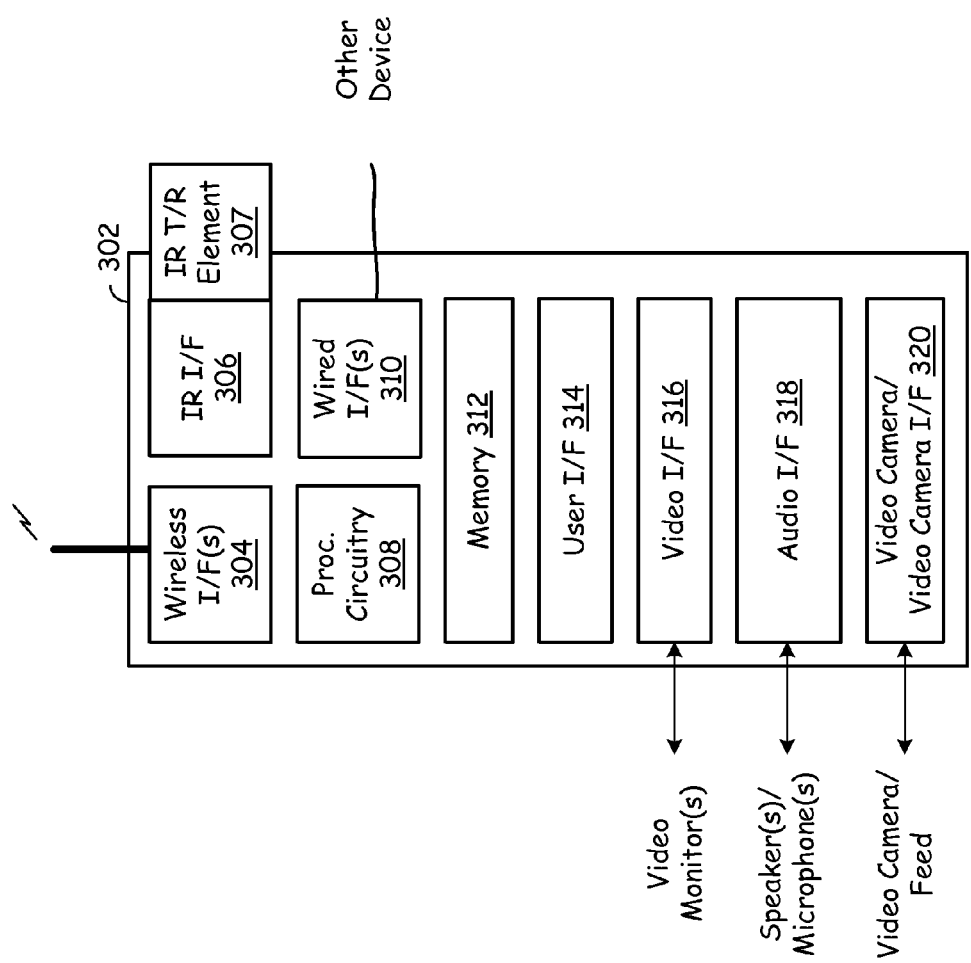
FIG. 3 is a block diagram illustrating a game console constructed according to one or more embodiments of the present invention.

FIG. 3 is a block diagram illustrating a game console constructed according to one or more embodiments of the present invention. The game console 302 of FIG. 3 includes a wireless interface(s) 304, an infrared interface 306, an IR Transmit/Receive element 307, processing circuitry 308, one or more wired interfaces 310, and memory 312. The game console 302 typically also includes a user interface 314, a video interface 316, an audio interface 318, and may include a video camera/video camera interface 320. The wireless interface(s) 304 support wireless communications with at least the game controllers 108A, 108B, and 108C described with reference to FIG. 1. This wireless interface may be a Bluetooth interface, a wireless local area network (WLAN) interface, or another type of wireless communication interface that supports communications between the game console 302 and one or more game controllers. Further, the wireless interface 304 may support communications with a WLAN router or access point, a cellular infrastructure, a satellite communications network, or another type of wireless communications systems.

The IR interface 306 couples to the IR transmit/receive element 307 and supports IR communications with game controllers 108A, 108B, and 108C as shown in FIG. 1. The IR communications between the game console 302 and the game controllers 108A, 108B, and 108C may support an industry standard or proprietary communications protocol. The processing circuitry 308 may include one or more of a system processor, a digital signal processor, a processing module, dedicated hardware, application specific integrated circuit, or other circuitry that is capable of executing software instructions and for processing data. The processing circuitry 308 may perform some processing to detect a hovering finger and determine a position of the hovering finger, and then use that input as gaming input or non-gaming input. The memory 312 may be RAM, ROM, FLASH RAM, FLASH ROM, an optical memory, magnetic memory, or other types of memory that is capable of storing data and/or instructions in allowing processing circuitry to access same. The wired interface(s) 310 may include a USB interface, a fire wire interface, a serial interface, a parallel interface, an optical interface, or another type of interface supported by a media that is copper, metal, or optical.

The user interface 314 may include a keypad, a video display, cursor control, a touch pad, or other type of interface that allows a user to interface with the game console 302. The video interface 316 couples the game console 302 to one or more video monitors to provide display for the gaming environment supported by game console 302. The communications link between the video interface 316 on the video monitor(s) may be an HDMI interface, a composite video interface, component video interface, an S-video interface, or another type of video interface supported by both the video monitor and the game console 302. The audio interface 318 couples the game console 312 to speakers and/or microphones for audio content delivery and receipt. The video camera/video camera interface 302 may include an onboard video camera or may couple the game console 302 to an external video camera. The external video camera may be used to provide gaming input or other types of information that the game console 302 uses within its operation to produce a gaming environment. In one embodiment, the game console 302 could have a touch pad for detecting a hovering finger, determining a hovering finger condition, and detecting a position of the hovering finger in three-dimensions with respect to the touch sensitive pad.

FIG. 4A is a first perspective view of a game controller constructed according to one or more embodiments of the present invention. As shown in FIG. 4A, a game controller 402 includes a cursor control 404, mechanical buttons 410 and 406, and may include a touch pad 408. The cursor control 404 may be a touch pad. When 404 and 408 are both touch pads, they receive inputs and may be used for user identification, gaming input, or other operations supported by the gaming system and includes game controller 402. Touch pads 404, 408 can detect a hovering finger, as further described herein.

FIG. 4B is a second perspective view of the game controller 402 of FIG. 4A that is constructed according to one or more embodiments of the present invention. As shown in FIG. 4B, a reverse portion of the game controller 402 may include a touch pad 452. The touch pad 452 may wrap around a back portion of the game controller 402. Alternatively, the touch pad 452 may reside on a battery cover of the game controller 402. As will be described further herein, the touch pad 452 includes a plurality of touch pad locations/touch sensitive elements that receive input that may be further used for user ID, gaming input, and/or other purposes. The touch pad 452 can detect a hovering finger as further described herein.

Figure 5:
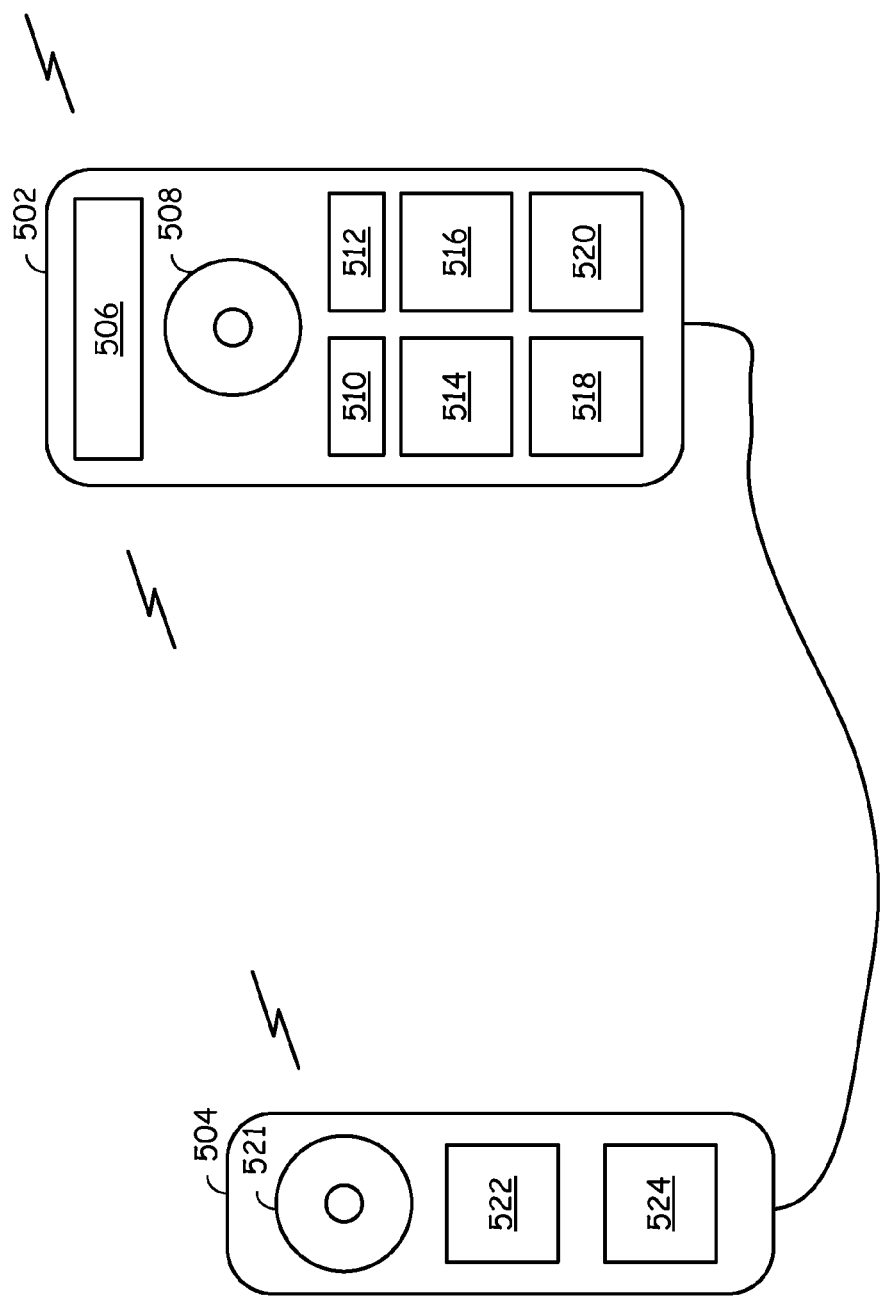
FIG. 5 is a block diagram illustrating a game controller and coupled secondary game controller, both of which are constructed according to one or more embodiments of the present invention.

FIG. 5 is a block diagram illustrating a game controller and coupled secondary game controller, both of which are constructed according to one or more embodiments of the present invention. As shown in FIG. 5, primary game controller 502 includes a display 506, a circular input device 508, and button inputs 510, 512, 514, 516, 518, and 520. Any of these input devices 508, 510, 512, 514, 516, 518, and 520 of primary game controller 502 may be touch pads, as is further described herein. These touch pads receive gaming input in a manner that is consistent with mechanical counterparts that were previously implemented according to prior devices. These touch pads can detect a hovering finger, or a hovering foot in cases where a touch pad is operated by a foot, such as the Wii™ Balance Board, a Dance Revolution™ mat, or some other similar foot operated game.

The primary game controller 502 couples to secondary game controller 504 via either a wired or a wireless interface. The secondary game controller 504 includes input components 521, 522, and 524. These input components of the secondary game controller 504 may be embodied by either mechanical input devices or touch pads. The manners in which touch pads are implemented are described further herein. Data collected from these input components 521, 522, and 524 are relayed to game controller 502, which may process the inputs. Alternately, the input received from input components 521, 522, and/or 524 may be relayed to a servicing game console. The primary game controller 502 and the secondary game controller 504 may both be hand-held devices. Alternately, one or the other of these game controllers may be placed on the floor, inserted into a simulated gaming piece, e.g., guitar, drums, simulated golf club, simulated baseball bat, etc. Each of these game controllers 502 and 504 may capture touch pad input as is further described herein with reference to the FIGS. The touch pad input captured by game controllers 502 and 504 may be processed to produce combined gaming input or transmitted separately to a game console 202. The combined or separate touch pad input may be used as gaming input, may be processed to identify a user, or may be processed to otherwise provide input to a supported video game.

Figure 6:
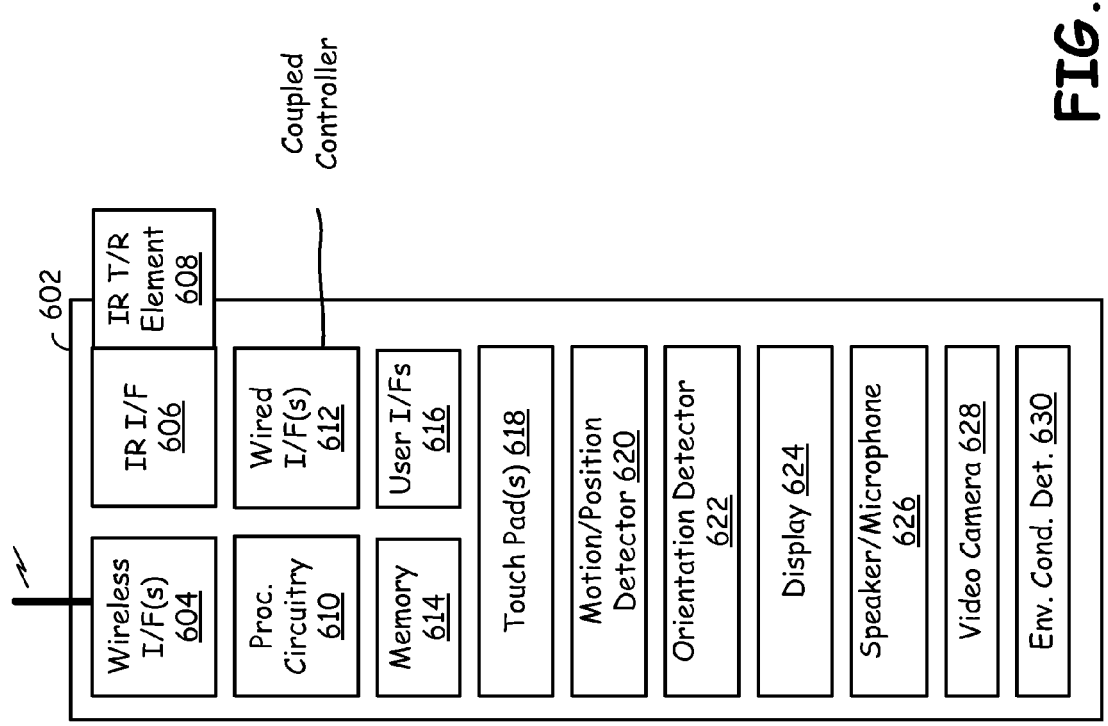
FIG. 6 is a block diagram illustrating a game controller constructed according to one or more embodiments of the present invention.

FIG. 6 is a block diagram illustrating a game controller constructed according to one or more embodiments of the present invention. The game controller 602 includes one or more wireless interfaces 604, an IR interface 606 that includes an IR transmit/receive element 608, processing circuitry 610, wired interface(s) 612, memory 614, and user interface(s) 616. These particular components of the game controller 602 may be similar to the like named components of the game console 302 illustrated in FIG. 3 and described with reference thereto. However, in other embodiments, these like named components may have differing construct/functionality, e.g., smaller memory, less processing capability, lower power wireless interfaces, etc. Thus, commonly named components will not be described further herein as they have been previously described with reference to FIG. 3.

The game controller 602 includes one or more touch pad(s) 618, motion/position detector 620, orientation detector 622, display 624, speaker/microphone 626, and a video camera 628. The game controller may also include other components such as one or more environmental conditions detectors 630 that are used to sense environmental conditions such as temperature, humidity, and other environmental conditions. The structure and operations of the touch pads 618 will be described further herein with reference to subsequent FIGS. The motion/position detector 620 detects motion/acceleration of the game controller 602. Detection of such motion/acceleration may be performed in conjunction with the game controller, using a GPS system, using an accelerometer or gyrator of the game controller 602 and/or using external components to determine motion/acceleration position of the game controller. The motion/position detector 620 may also determine position of the game controller. The manner in which the motion/position detector 620 determines the position of the game controller 602 is not described further herein. However, the position detector 620 may use external reference devices in order to determine position of the game controller within a gaming environment. Motion, acceleration, and position of the game controller 602 may be provided to a servicing game console as a gaming input. The game controller 602 supports detection of a hovering finger and determines a position of the hovering finger in three-dimensions, as described herein.

The orientation detector 622 determines an orientation and/or direction in which the game controller is pointed. Such orientation detection provided by orientation detector 622 may be accomplished in conjunction with the IR interface 606 of the game controller 602. Such orientation detection may be performed in conjunction with the IR detector 106 of the gaming system 100 of FIG. 1.

The display 624 of the game controller 602 may have a relatively small size or relatively large size that presents information to a user and that allows the user to respond accordingly. The speaker/microphone 626 may receive audio input and provide audio output to a user of the game controller 602. Audio input captured by the microphone may be used in conjunction with touch pad 618 input for user identification and/or for gaming input. Video camera 628 of the game controller may be used to determine a location of the game controller and/or may be used to provide additional gaming input for gaming environments supported by the game controller 602.

According to one particular aspect of the gaming system of FIG. 1, the touch pad(s) 618 of the game controller 602 (and/or game console) may be capacitive, inductive, or RF based. With regard to inputs received via the touch pad of the game controller, the raw data received by the touch pad of the game controller may be fully communicated to the game console of the gaming system. Alternatively, information captured via the touch pad(s) 618 of the game controller may be processed by the processing circuitry 610 of the game controller 602 (or other processing circuitry such as the touch pad processing circuitry shown in FIG. 6, which may be different or the same as the processing circuitry 610) prior to communicating such information to the game console 102 of FIG. 1. Such processing may be full or partial to determine whether and what data to upload to the game console.

Referring again to FIG. 5, the touch pad input received by game controller may be received at both primary 502 and secondary 504 game controllers of FIG. 5. The input received from multiple touch pads of the primary and secondary game controllers 502 and 504 may be received and at least partially processed by processing circuitry of the game controller(s) prior to uploading the data to a game console. The basis for touch pad input processing may be based upon a current usage of the game controllers. For example, the primary game controller 502 may be relevant to a first portion of a user's body while the secondary game controller 504 may be relevant to a second portion of a user's body. In one particular example, teachings of the present invention apply touch pad operations to an input device that receives data corresponding to one or more feet of a user, e.g., secondary controller 504 is a foot pad. In such case, a hovering foot may be detected with the position (in three dimensions with respect to a touch pad of the secondary controller 504) relayed to a gaming console 102 for gaming input. Such detection of the hovering foot's position may be updated continually to track the position of the foot over time with respect to the touch pad used for such detection. This position tracking may serve as continual input to a supported video game. Of course, these operations may also be applied to detection of a hovering finger and its position for gaming or other input.

Figure 7:
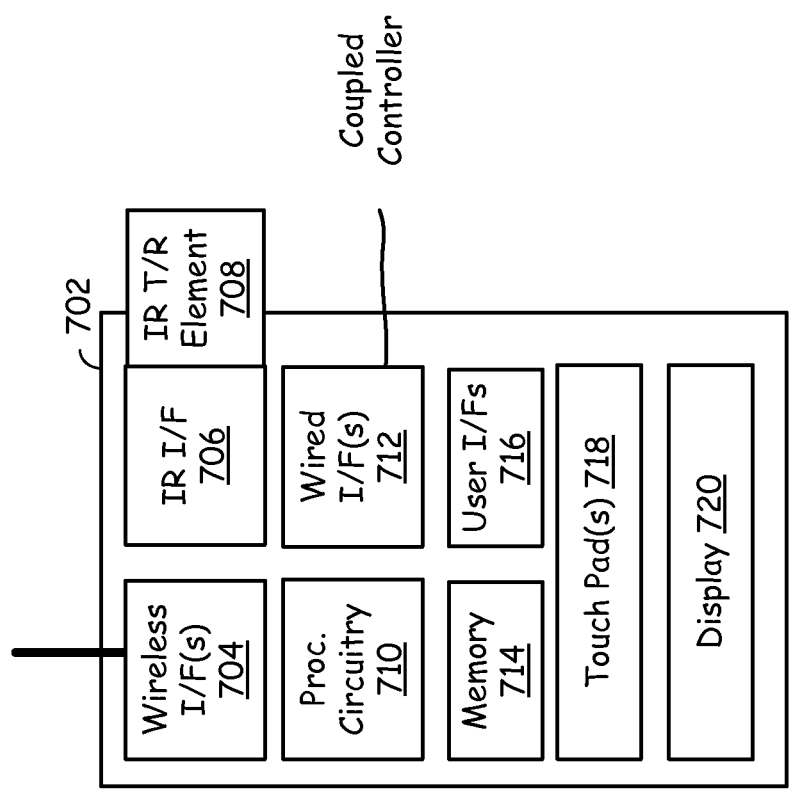
FIG. 7 is a block diagram illustrating an entertainment system remote control constructed according to one or more embodiments of the present invention.

FIG. 7 is a block diagram illustrating an entertainment system remote control constructed according to one or more embodiments of the present invention. The remote control 702 may be used as one of the remote controls 208A, 208B, or 208C in conjunction with the multimedia system 202 of the system 200 of FIG. 2. The remote control includes one or more wireless interfaces 704, IR interface 706 that includes an IR T/R element 708, processing circuitry 710 and one or more wired interfaces 712. The remote control 702 further includes memory 714, one or more user interfaces 716, one or more touch pads 718, and/or one or more displays 720. The remote control 702 of FIG. 7 may include components that are of same/similar construct as those components previously described with reference to the game controller 602 of FIG. 6. However, as is illustrated in FIG. 7, the remote control 702 may have fewer components than those typically included with a game controller. The functions of each of the components of the remote control 702 of FIG. 7 may have similar input characteristics to those of game controller 602 of FIG. 6. The touch pads 718 of the remote control 702 of FIG. 7 may be used to detect the presence of a hovering finger and the position of such hovering finger. The hovering finger detection and position determination may be used for remote control 702 input.

Figure 8:
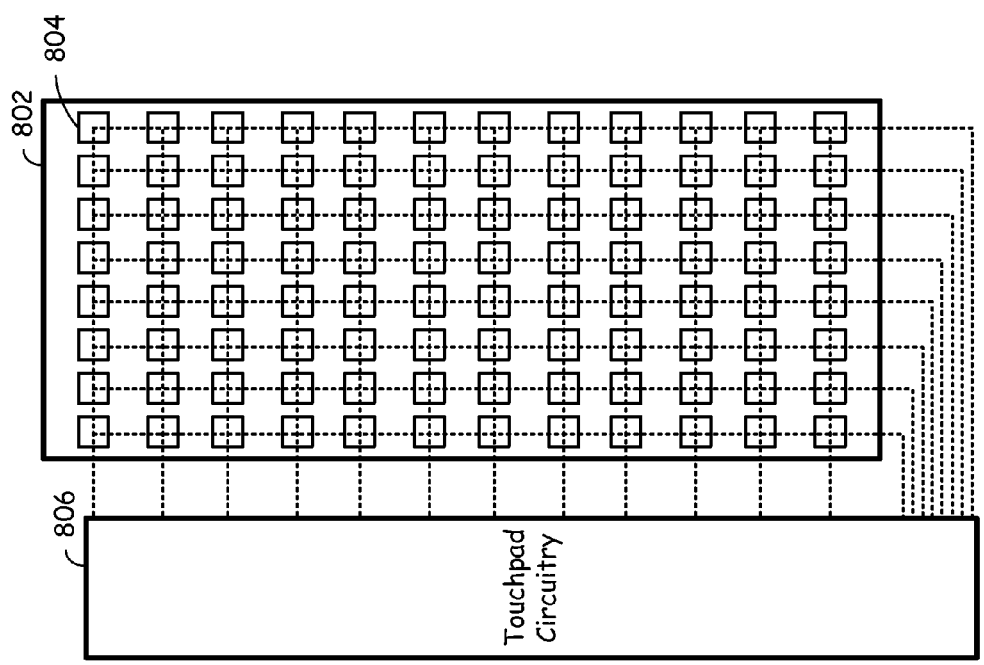
FIG. 8 is a block diagram illustrating a touch sensitive pad and touch pad circuitry constructed according to one or more embodiments of the present invention.

FIG. 8 is a block diagram illustrating a touch sensitive pad and touch pad circuitry constructed according to one or more embodiments of the present invention. A touch pad 802 includes a plurality of touch sensitive elements 804 each of which corresponds to a particular location of the touch pad 802. With the embodiment of FIG. 8, the touch pad includes an array of touch sensitive elements 804, each of which may be a particular capacitively coupled location, inductively coupled location, or a radio frequency (RF) touch sensitive element. Touch pad circuitry 806 couples via a grid structure to the plurality of touch sensitive elements 804 to sense the particular capacitance, inductive, or RF characteristics at each of the touch sensitive elements.

Touch pad circuitry 806 scans the plurality of touch sensitive elements 804 via access of particular row-column combinations at particular times. The frequency or voltage at which the touch pad circuitry 806 scans the plurality of touch sensitive elements 804 may be altered over time. Choosing the scanning frequency or scanning voltage may be based upon a particular operational use of the touch pad. For example, at some points in time the manner in which the touch pad is scanned will change based upon a particular point in a game of a gaming system with which the touch pad functions as a gaming input device. Further, a first scanning frequency/scanning voltage may be employed for user identification while a second scanning frequency/scanning voltage may be employed for gaming input functions.

The scanning done by the touch pad circuitry 806 of the plurality of touch sensitive elements 804 may be made using a spread spectrum frequency scanning technique. Such technique may be employed to more efficiently capture information from the touch pad 802 at the various touch sensitive elements 804 or to determine which particular scanning frequencies are more successful than others in capturing input information.

Further, the scanning of each row and column corresponding to a particular touch sensitive element 804 may be altered based upon a detected capacitance (inductance/RF propagation) at the location. For example, one particular touch sensitive element 804 may have a fixed capacitance that does not vary over time. Such fixed capacitance may indicate that the particular touch sensitive element 804 is inoperable or that it receives no discernable input. In such case, by not scanning the particular touch sensitive element, other touch sensitive elements may be more frequently scanned or energy may be saved by not scanning all touch sensitive elements.

According to another aspect of the present invention, some portions of the touch pad may be disabled while others are enabled at differing points in time. Enablement of some touch sensitive elements and not others may be based upon a custom configuration of the touch pad for a particular input function provided.

The touch pad 802 may also be calibrated by the touch pad circuitry 806 based upon the environmental factors such as temperature, humidity, and surrounding noise from the capacitance, inductance, or RF perspective. Calibration of the touch pad 802 allows the touch pad 802 to have more efficient and effective touch pad input for user identification and/or for other input purposes.

The touch pad 802 may also be calibrated by the touch pad circuitry 806 based upon the environmental factors such as temperature, humidity, and surrounding noise as detected by measured capacitance, inductance, or RF propagation characteristics. Calibration of the touch pad 802 allows the touch pad 802 to be more efficient and more effectively receive touch pad input for user identification and/or for other input purposes. The calibration of the touch pad 802 by the touch pad circuitry 806 may be initiated at particular points in time. The touch pad circuitry 806 may simply initiate calibration of the touch pad 802 upon the expiration of a timer such that the touch pad is calibrated at a particular regular time interval. Alternatively, the touch pad 802 may be calibrated after a period of inactivity, i.e., the touch pad circuitry 806 performs calibration when it determines that no input is present on the touch pad 802. With other operations or embodiments, the touch pad 802 may be calibrated by the touch pad circuitry 806 using other input criteria as well.

The touch pad 802 is able to detect a hovering finger and detect a position of the hovering finger in three-dimensions with respect to the touch sensitive pad. While all the touch sensitive elements 804 in FIG. 8 are shown to be uniform, some touch sensitive elements could be different in structure, size, and/or function. Some touch sensitive elements could measure capacitance. Some touch sensitive elements could measure inductance. Some touch sensitive elements could measure Radio Frequency (RF) impedance. Subsequent FIGS. show variance in structure that assists in the detection of a hovering finger condition and position. FIG. 8 does not show a touch pad display with the touch pad 802, but subsequent FIGS. 11, 13, and 14 show touch pad display elements and touch pad display circuitry that causes a button and other control icons to be illuminated or otherwise displayed.

FIG. 9 is a block diagram illustrating a portion of a touch sensitive pad 902 having touch sensitive elements 906, 908 that are not uniform and touch pad circuitry 904 constructed according to one or more embodiments of the present invention. The touch pad 902 includes a plurality of touch sensitive elements 906, 908 each of which corresponds to a particular location of the touch pad 902. With the embodiment of FIG. 9, the touch pad 902 includes an array of touch sensitive elements 906, 908 that are not uniform, each of which may be a particular capacitively coupled element, inductively coupled element, or a radio frequency (RF) touch sensitive element. Touch pad circuitry 904 couples via a grid structure to the plurality of touch sensitive elements 906, 908 to sense the particular capacitance, inductive, or RF characteristics of each of the touch sensitive elements. With the differing size of the touch sensitive elements 906 and 908, even if they are of the same type, e.g., capacitive, inductive, RF, they will have differing operational properties. These differing operational properties assist in detection of a hovering finger and in determining a position of the hovering finger in three-dimensions.

Touch pad circuitry 904 scans the plurality of touch sensitive elements 906, 908 via access of particular row-column combinations at particular times. The touch pad circuitry 904 may be processing circuitry, dedicated circuitry, or other logic circuitry with element sending capabilities. The frequency or voltage at which the touch pad circuitry 904 scans the plurality of touch sensitive elements 906, 908 may be altered over time. Choosing the scanning frequency or scanning voltage may be based upon a particular operational use of the touch pad. For example, at some points in time the manner in which the touch pad is scanned will change based upon a particular point in a game of a gaming system with which the touch pad functions as gaming input device. Further, a first scanning frequency/scanning voltage may be employed for user identification while a second scanning frequency/scanning voltage may be employed for gaming input functions.

Further, the scanning done by the touch pad circuitry 904 of the plurality of touch sensitive elements may be done using a spread spectrum scanning frequency technique with which the scanning frequency varies with time. Such technique may be employed to more efficiently capture information from the touch pad 902 at the various touch sensitive elements 906, 908 or to determine which particular scanning frequencies are more successful than others in capturing input information.

Further, the scanning of each row and column corresponding to a particular touch sensitive element 906, 908 may be altered based upon a detected capacitance (inductance/RF propagation) at the location. For example, one particular touch sensitive element 906, 908 may have a fixed capacitance that does not vary over time. Such fixed capacitance may indicate that the particular touch sensitive element 906, 908 is inoperable or that it receives no discernable input. In such case, by not scanning the particular touch sensitive element, other touch sensitive elements may be more frequently scanned or energy may be saved by not scanning all touch sensitive elements.

In FIG. 9, the touch sensitive elements 906, 908 are of different sizes, which results in different sensitivities of the touch sensitive elements 906, 908 to the presence of a finger or toe, for example. In one embodiment, touch sensitive elements 906, 908 all measure capacitance. In another embodiment, touch sensitive elements 906, 908 all measure inductance. And in yet another embodiment, touch sensitive elements 906, 908 all measure Radio Frequency (RF) impedance. Several other embodiments are also possible with a combination of different types of touch sensitive elements. For example, in one embodiment, touch sensitive elements 906 measure capacitance, while touch sensitive elements 908 measure inductance. In another embodiment, touch sensitive elements 906 measure capacitance and touch sensitive elements 908 measure RF impedance. In one embodiment touch sensitive elements 906 measure inductance, and touch sensitive elements 908 measure capacitance. In another embodiment, touch sensitive elements 906 measure inductance, and touch sensitive elements 908 measure RF impedance. In one embodiment, touch sensitive elements 906 measure RF impedance, and touch sensitive elements 908 measure capacitance. In another embodiment, touch sensitive elements 906 measure RF impedance, and touch sensitive elements 908 measure inductance.

The touch sensitive elements 906, 908 are scanned to measure a plurality of touch sensitive element values. The plurality of touch sensitive element values is compared to a hovering finger threshold pattern. Upon a favorable comparison, a hovering finger condition is determined, and a position of the hovering finger in three-dimensions is detected with respect to the touch sensitive pad 902. The plurality of touch sensitive element values is compared to a touching finger threshold pattern. Upon a favorable comparison, a touching finger condition is determined, and a position of the touching finger is detected upon the touch sensitive pad 902.

In one embodiment, a hovering finger threshold pattern is a first touch sensitive element value threshold for at least one central touch sensitive element 906, and a second touch sensitive element value threshold, less than the first touch sensitive element value, for a set of touch sensitive elements 908 located about the at least one central touch sensitive element. Upon a determination of the hovering finger condition the processing circuitry 904 is further operable to adjust measuring sensitivity of a set of touch sensitive elements (some of 906, 908) to increase z-axis sensitivity.

In another embodiment, the set of the plurality of touch sensitive elements 906, 908 reside about the at least one touch sensitive element determined to be most proximate to the hovering finger. In yet another embodiment, to assist in detecting a hovering finger, the touch pad 902 has a first set of touch sensitive elements 906 having first element constructs and a second set of touch sensitive elements 908 having second element constructs which are different from the first element constructs.

In some embodiments, the plurality of touch sensitive elements 906, 908 of the touch pad 902 have one or more of a plurality of capacitance detection touch sensitive elements interspersed with a plurality of Radio Frequency (RF) impedance detection touch sensitive elements, a plurality of inductance detection touch sensitive elements interspersed with a plurality of RF impedance detection touch sensitive elements, and/or a plurality of capacitance detection touch sensitive elements interspersed with a plurality of inductance detection touch sensitive elements.

FIG. 10 is a block diagram illustrating a portion of a touch sensitive pad with central elements 1002 having one or more sets of surrounding touch sensitive elements 1004, 1006 according to one or more embodiments of the present invention. FIG. 10 illustrates a portion of a touch pad with four sets of elements each having a central element 1002 with sets of touch sensitive elements 1004, 1006 disposed about the central element 1002. The touch sensitive elements are scanned to measure a plurality of touch sensitive element values. The plurality of touch sensitive element values is compared to a hovering finger threshold pattern. Upon a favorable comparison, a hovering finger condition is determined, and a position of the hovering finger in three-dimensions is detected with respect to the touch sensitive pad. The plurality of touch sensitive element values is compared to a touching finger threshold pattern. Upon a favorable comparison, a touching finger condition is determined, and a position of the touching finger is detected upon the touch sensitive pad.

In one embodiment, a hovering finger threshold pattern is a first touch sensitive element value threshold for at least one central touch sensitive element 1002, and a second touch sensitive element value threshold, less than the first touch sensitive element value, for a set of touch sensitive elements 1004, 1006 located about the at least one central touch sensitive element 1002. Upon a determination of the hovering finger condition the processing circuitry is further operable to adjust measuring sensitivity of a set of touch sensitive elements 1004, 1006 to increase z-axis sensitivity.

In another embodiment, the set of the plurality of touch sensitive elements 1004, 1006 are scanned to detect a z-axis position of the hovering finger reside about the at least one touch sensitive element determined to be most proximate to the hovering finger. In yet another embodiment, to assist in detecting a hovering finger, the touch pad has a first set of touch sensitive elements 1004 having first element constructs, and a second set of touch sensitive elements 1006 having second element constructs which are different from the first element constructs.

In one embodiment, the plurality of touch sensitive elements of the touch pad have one or more of a plurality of capacitance detection touch sensitive elements interspersed with a plurality of Radio Frequency (RF) impedance detection touch sensitive elements, a plurality of inductance detection touch sensitive elements interspersed with a plurality of RF impedance detection touch sensitive elements, and a plurality of capacitance detection touch sensitive elements interspersed with a plurality of inductance detection touch sensitive elements.

FIG. 11 is a diagrammatic side view illustrating the motion of a user's finger from one position 1106 to a second position 1108 while hovering above a touch pad 1102 constructed and operating according to one or more embodiments of the present invention. The touch pad 1102 of FIG. 11 includes a plurality of touch sensitive elements 1104. Each touch sensitive element 1104 corresponds to a particular location of the touch sensitive pad 1102. Touch pad circuitry 1112 couples to the plurality of touch sensitive elements 1104, to processing circuitry 1116, and to touch pad display circuitry 1114. Touch pad circuitry 1112 scans the plurality of touch sensitive elements 1104 to determine touch sensitive element values.

Touch pad circuitry 1112, either solely or in combination with the processing circuitry 1116, determines the presence of one or more hovering fingers and determines whether one or more fingers touches the touch pad 1102. Alternately, such processing may be done remotely with the touch pad circuitry and/or processing circuitry transmitting touch pad element values to another device/location.

The hovering finger alters the capacitance, inductance, and/or RF propagation characteristics, as seen by each touch sensitive element 1104 of the touch pad 1102. The touch pad circuitry 1112 determines a difference in a position of the hovering finger in three-dimensions from a first position 1106 to a second position 1108 by measuring element values of the touch sensitive elements 1104. Touch sensitive element values can be touch sensitive element measured capacitance, touch sensitive measured inductance, or touch sensitive element measured Radio Frequency (RF) impedance or a combination of two or more of these touch sensitive values. A corresponding capacitance (inductance or RF propagation) pattern of element values of the touch pad display 1110 of FIG. 11 is illustrated in FIG. 12. Such detection of the hovering finger is performed by first calibrating the touch pad 1102 and then by comparing touch sensitive element values to a hovering finger threshold pattern that is commensurate to the hovering finger.

The touch pad display 1110 includes a plurality of touch sensitive elements 1104 that may be selectively controlled to display buttons and/or other icons to a user, such buttons and/or other icons relating to corresponding touch sensitive elements 1104. As will be further described with reference to FIGS. 13 and 14, a button icon may be altered in appearance upon detection of a hovering finger as feedback to a user to indicate that the user's finger is adjacent a particular button icon, e.g., number/letter/function button.

FIG. 12 is a diagram illustrating a touch pad 1102 and the manner in which a hovering finger may be detected via differing capacitance levels according to one or more embodiments of the present invention. Relative capacitance, inductance, or RF impedance at particular locations is shown. For example, a capacitance ring 1206 corresponds to the first position 1106 location of a hovering finger of FIG. 11. Further, capacitance rings 1208 of FIG. 12 correspond to the second position 1108 of the hovering finger of FIG. 11. These capacitance rings 1206 and 1208 are illustrative only to indicate particular element value patterns that are caused by a hovering finger. Detection of the hovering finger at the first position 1106 and second position 1108 of FIG. 11 is performed by comparing the touch pad element values to expected pattern(s) of element values for a hovering finger, i.e., these capacitance ring element values 1206 and 1208 to respective patterns.

Because the detection of a hovering finger or other hovering objects above the touch pad 1102 is relatively difficult to ascertain, touch panel scanning sensitivity may be adjusted to detect the hovering finger. Different touch sensitive element sensitivities in the touch pad grid of the various touch pad locations or touch sensitive elements 1104 may aid in detection of a hovering finger and determination of a hovering finger z-axis distance. For example, comparison of the detected capacitance between paired elements corresponding to touch pad locations or touch sensitive elements 1104 of the touch pad 1102 array may assist in the detection of a hovering distance of a finger. The shape of touch sensitive elements affects the detection operations. The elements sensitivity of touch sensitive elements may be calibrated based upon the panel shape to assist and correctly determine the existence of a relative position of the hovering finger in three-dimensions.

Further, the resolution/sensitivity of touch sensitive elements 1104 may be altered after initial detection of the hovering finger, as in the detection of the first position 1206 of the hovering finger in FIG. 12.

Processing of touch sensitive element values may be performed to increase a detected z-axis resolution of the touch pad 1102, e.g., pattern recognition, pattern matching, historical pattern comparison, etc. Such accuracy in detection in the z-axis from the touch pad 1102 of a hovering finger may be further enhanced by correlating measured values of paired touch sensitive element location values across the touch pad 1102. For example, after initial detection of a hovering finger, element values of sets of elements may be compared to one another to firstly estimate an x-y position of the hovering finger and subsequently to estimate a z-axis position of the hovering finger. A difference in sensitivity of measured capacitance (inductance/RF propagation) values at the grid from location-to-location also aids in determination of the z-axis position of the hovering finger.

The hovering distance of a finger or other component of a user such as a toe, or other part of a hand or foot, may directly control movement of a game element in a 3D gaming environment. For example, if a user picks up a foot above a foot pad as a game input device, the lifting of the foot above the touch pad may fully correspond to action of the user within the gaming environment. Such activity may correspond to an actual kick in a role playing game or in a football game, for example. The resolution of particular areas on the display may be altered based upon feedback received from a host game console in determining whether or not detection of a hovering finger or hovering other element of the user's body as detected. Further, the scanning power frequency of the touch pad 1102 may be adjusted to assist in hovering distance detection. Moreover, the scanning frequency and power may also be jointly adjusted in order to detect these hovered finger distances.

FIG. 13 is a diagrammatic side view illustrating the motion of a user's finger 1302 from one position downward while hovering above a touch pad 1102 according to one or more embodiments of the present invention. The touch pad 1102 of FIG. 13 includes a plurality of touch sensitive elements 1104. Each touch sensitive element 1104 corresponds to a particular location of the touch sensitive pad 1102. Touch pad circuitry 1112 couples to the plurality of touch sensitive elements 1104, to processing circuitry 1116, and to the touch pad display circuitry 1114. The touch pad display includes a plurality of touch pad display elements 1110 that are controlled by the touch pad display circuitry. The touch pad elements 1110 are operated by the touch pad display circuitry 1114 to display button icons, button replacement icons, and other items on the touch pad.

With one embodiment, as will be further illustrated and described with reference to FIG. 14, a button icon is displayed that corresponds to one or more touch pad elements. In a default condition, the button icon is indicated as not being depressed. In one operation, a hovering finger detection condition is determined that corresponds to the button icon. Based upon detection of the hovering finger, a partial depression of the icon is indicated via the touch pad display. Then, as the hovering finger moves in the z-direction toward a surface of the touch pad, as determined, the button icon is altered to indicate additional depression. Finally, when the finger is determined to have touched the touch pad, the touch pad display indicates a full button depression.

FIG. 14 is a diagram illustrating a touch pad and the manner in which a button icon of a corresponding touch pad display indicates varying depressions upon detection of a hovering finger according to one or more embodiments of the present invention. Button icons 1406, 1408, 1410, 1412, 1414, 1416, 1418, 1420, 1422, 1424, 1426, and 1428 are displayed on the touch pad 1402 by a touch pad display that includes touch pad display circuitry and a plurality of touch pad display elements. The touch pad display elements are controlled by the touch pad display circuitry to alter indication of the buttons from no depression, to partial depression, and to full depression based upon a hovering finger, partial depression of finger, and full depression of finger. Touch sensitive elements 1404 correspond to the buttons 1406, 1408, 1410, 1412, 1414, 1416, 1418, 1420, 1422, 1424, 1426, 1428, which are presented using the touch pad display.

Figure 15:
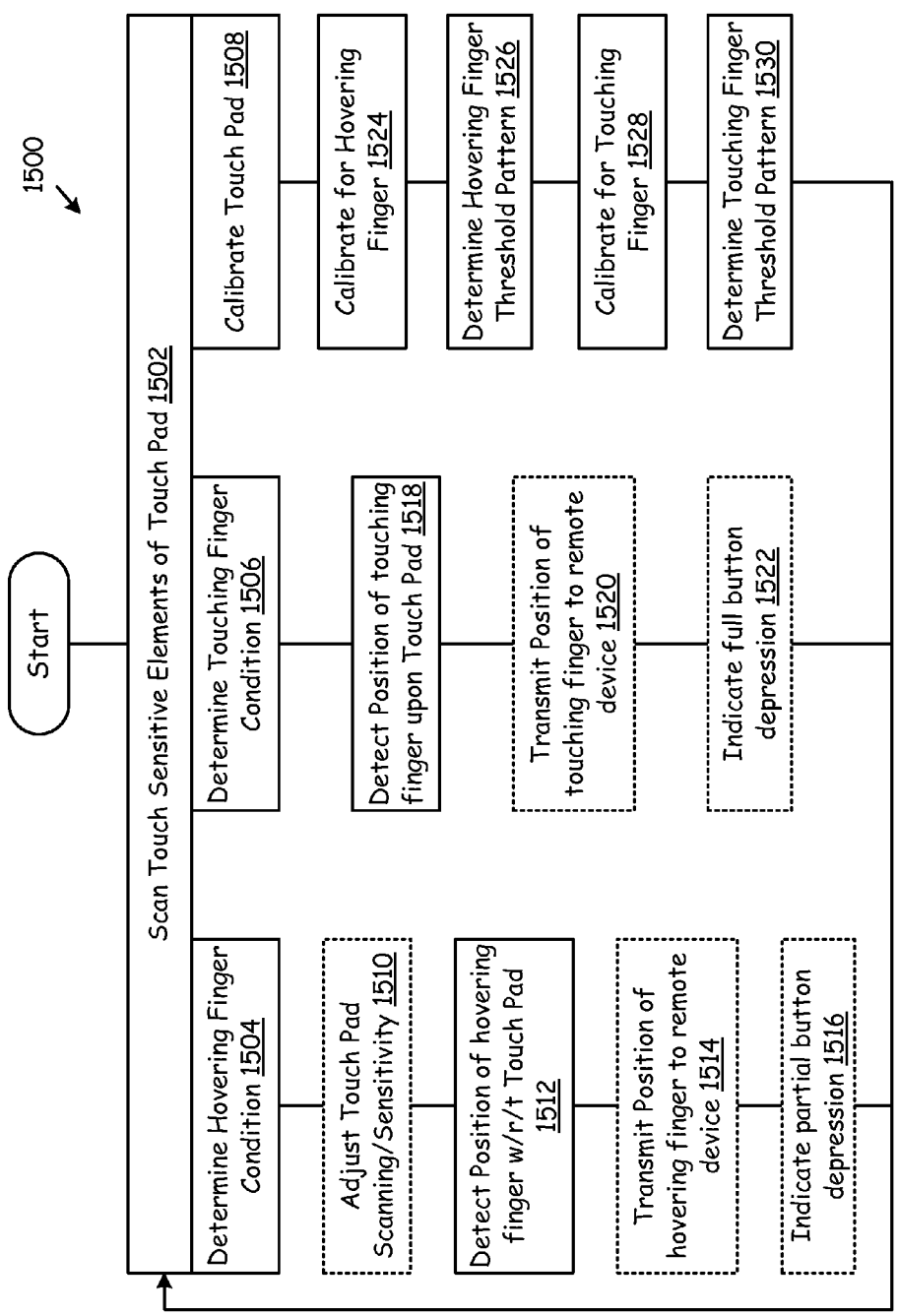
FIG. 15 is a flowchart illustrating operation of a touch pad according to one or more embodiments of the present invention.

FIG. 15 is a flowchart illustrating operation of a touch pad according to one or more embodiments of the present invention. The apparatus of FIGS. 1-14 can singularly or jointly perform the operations of the FIG. 15. With some of these FIGS. processing performed is not identified as being performed by a particular device. In such case the processing may be performed by one or both of a game controller and/or a game console, one or both of a remote control and a multimedia system, and/or other devices. It is understood that "hovering finger" of the present invention can relate to one or more hovering fingers, any part of one or more hands, one or more toes, and/or any part of one or more feet.

Touch pad circuitry (or other circuitry) scans the plurality of touch sensitive elements of the touch pad at step 1502. Such scanning may be continuous when the touch pad is actively providing gaming input, user ID input, etc. However, scanning may be activated and inactivated over time and the scanning characteristics may be altered from time to time, e.g., scanning frequency, scanning sensitivity, etc. based upon the function that the touch pad is providing. From step 1502, various operations may occur as set forth in FIG. 15. With a first operation, a hovering finger condition is determined, step 1504. With a second operation, based upon the scanning, a touching finger condition may be detected at step 1506. Further, calibration operations may be initiated at step 1508.

A hovering finger condition is detected at step 1504 when measured touch sensitive element values compare favorably to a hovering finger threshold pattern. One such pattern was illustrated in FIG. 12 and described therewith. Generally, a hovering finger will produce a unique pattern and measured values for a plurality of touch sensitive elements. When this pattern is detected, a favorable comparison results at step 1504. Upon such a determination, touch pad scanning and sensitivity parameters may be adjusted, step 1510, to make the touch pad more or less sensitive. For example, when the touch pad is more sensitive, it can detect a hovering finger that is further away from the touch pad. Adjusting scanning or sensitivity parameters of the touch panel may include only scanning a group or set of the touch sensitive elements, such scanning intended to best be able to detect the hovering finger and its relative position.

A position of the hovering finger in three-dimensions is then detected with respect to the touch sensitive pad, step 1512, such detection producing coordinates within a coordinate system established for the touch pad. The coordinates determined for the hovering finger may include a most centrally detected location of the hovering finger, an outline of the hovering finger and/or a relative position of the hovering finger in the z-axis with respect to the touch pad. Optionally, a position of a hovering finger is transmitted to a remote device, step 1514, as in FIGS. 2 and 7. Further, as another optional step, partial button icon depression can be indicated, step 1516, as was described previously with reference to FIGS. 13-14.

A touching finger condition is detected at step 1506 when measured touch sensitive element values compare favorably to a touching finger threshold pattern. The position of the touching finger is detected upon the touch sensitive pad, step 1518. Optionally, the position of a touching finger is transmitted to a remote device, step 1520. Optionally, full button icon depression may be indicated, step 1522, via the touch pad display as was previously described herein.

At any time, the touch pad may be calibrated, step 1508, so as to better detect a hovering finger or a touching finger. The touch pad may also be calibrated by touch pad circuitry based upon environmental factors such as temperature, humidity, and surrounding noise from the capacitance, inductance, or RF perspective. Calibration of the touch pad allows the touch pad to have more efficient and effective touch pad input for user identification and/or for other input purposes. Further, the calibration of the touch pad by the touch pad circuitry may be initiated at particular points in time. The touch pad circuitry may simply initiate calibration of the touch pad upon the expiration of the timer such that the touch pad is calibrated at a particular regular time interval. Alternatively, the touch pad may be calibrated after a period of inactivity so that the touch pad circuitry may determine that no input is present on the touch pad. With other operations or embodiments, the touch pad may be calibrated by the touch pad circuitry using other input criteria as well.

With the calibration operations, the touch pad may be calibrated for a hovering finger at step 1524. For this calibration, a user may be directed to hold his/her finger at a particular relative position for a period of time while touch sensitive elements are scanned. These directions/operations may be repeated for different portions of the display. Based upon these operations, the hovering finger threshold pattern may be determined at step 1526.

With the calibration operations, the touch pad may be calibrated for a touching finger at step 1528. For this calibration, a user may be directed to touch his/her finger at a particular location on the touch pad for a period of time while touch sensitive elements are scanned. These directions/operations may be repeated for different locations on the display. Based upon these operations, the touching finger threshold pattern may be determined at step 1530. From each of steps 1516, 1522, and 1530 operation returns to step 1502.

The structure of touch pads has been generally described previously herein with reference to FIGS. 1-14. Illustrated particularly in FIGS. 16-21B are rows and columns of the touch pad. Each of these rows and columns may be accessed to apply a signal (TX signal) or to measure a signal (RX signal). A unique combination of a row and a column may be used to access a particular touch sensitive element or touch pad location of the touch pad. As will be further described with reference to FIGS. 16-21B, TX signals may be applied and RX signals may be measured in a variety of manners in order to detect hovering fingers (stylus, toe, foot, etc.), determine location(s) of hovering fingers, detect touching fingers, and/or to determine location(s) of touching fingers (stylus, toe, foot, etc.).

The operations described with reference to FIGS. 16-21B may be used with any of the various operations previously describe herein with reference to FIGS. 1-15. These operations may be used solely or in combination with one another according to one or more embodiments of the present invention. These operations may be employed for hovering finger detection, touching finger detection, or a combination of these. These operations may be combined with one another or interspersed over time with one another in order to better serve the functions and goals described herein.

With each of FIGS. 16-21B, eight columns and eight rows are shown. In other embodiments, greater numbers of rows and/or columns or lesser numbers of rows and/or columns may be used. Further, the number or rows and columns may differ. Each of the rows and columns couple to electronics, e.g., touchpad circuitry, to apply a signal (TX) and/or to measure a signal (RX). The TX signal applied may be of varying voltage and form over time as is described herein. The RX signal measured may be a voltage signal and/or a current signal. A combination of row and column selection accesses a particular touch sensitive element/touch pad location. The touch sensitive element/touch pad location may be considered to be a capacitive element, an inductive element or an RF propagation element. The signal description of FIGS. 16-21B may be applied to any of these characteristics. With the nomenclature of FIGS. 16-21B, RX signals RX1-RX8 correspond to rows 1-8, respectively, and RX signals RX9-RX16 correspond to columns 1-8, respectively.

TX signals applied to rows or columns illustrated in FIGS. 16-21B may be voltage signals or current signals and have particular illustrated forms. These signals may take differing forms in differing embodiments/operations of the present invention. The reader should understand that these TX signals are illustrative only to described embodiments of the present invention and are not limiting.

Figure 16:
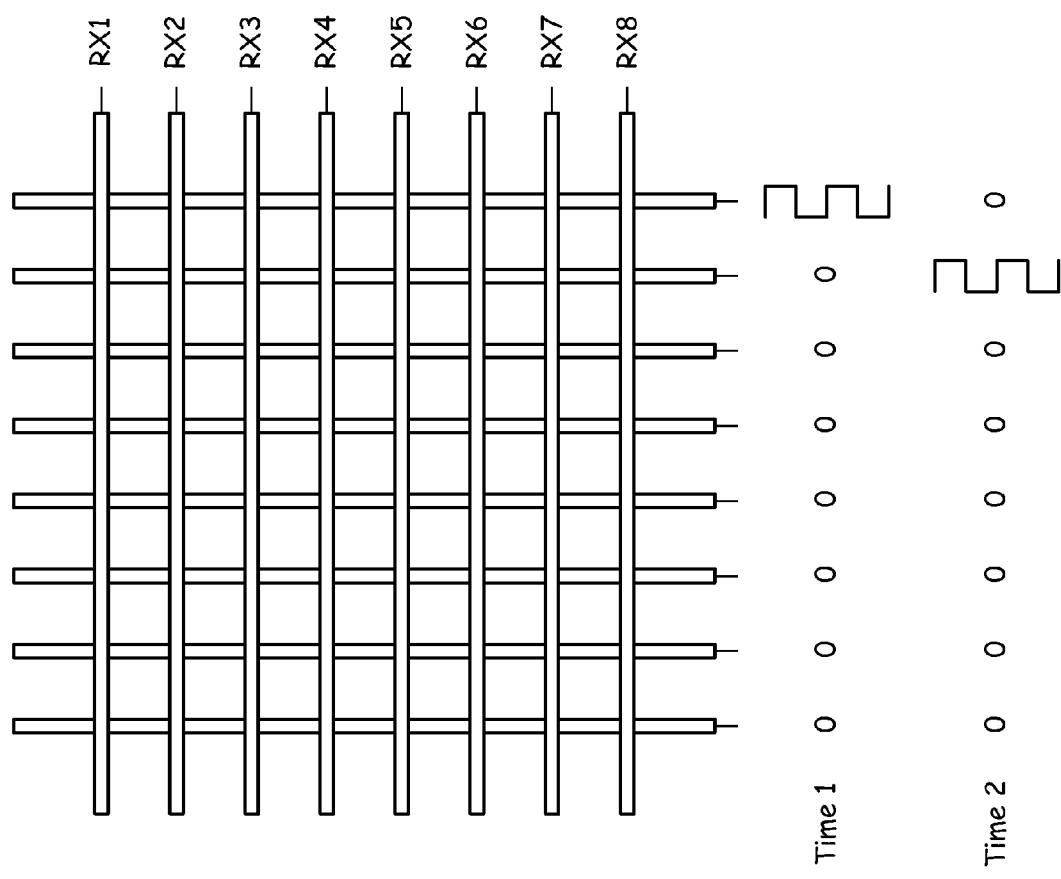
FIG. 16 is a diagram illustrating a touch pad during a first embodiment of hover mode operations according to one or more embodiments of the present invention.

FIG. 16 is a diagram illustrating a touch pad during a first embodiment of hover mode operations according to one or more embodiments of the present invention. The operations of FIG. 16 may be performed upon detection of a hovering finger condition. However, these operations could be performed at other times as well. With the operations of FIG. 16, a fast scan is employed with a TX signal applied in a time divided fashion to each column. With the illustration of FIG. 16, at a first time a TX signal is applied to a first column, at a second time a TX signal is applied to a second column, etc. Upon application of such TX signal RX signals are measured on each row. These operations may be referred to as normal fast scan operations and are applicable to any active mode of operation of the touch pad.

In some operations the normal fast scan operations are used for detection of a hovering finger due to the sensitivity available. With only one column energized with a signal at any time the Signal-to-Noise-Ratio (SNR) of the RX signal available at the rows is good. In order to better detect the hovering finger, the TX voltage may be doubled as compared to a standard TX voltage. By slowing the scan rate of the rows, the RX signals obtained at each row may be more easily noise filtered and integrated. For better coverage of all of the touch pad area the TX signal frequency may be increased during some operations.

Figure 17:
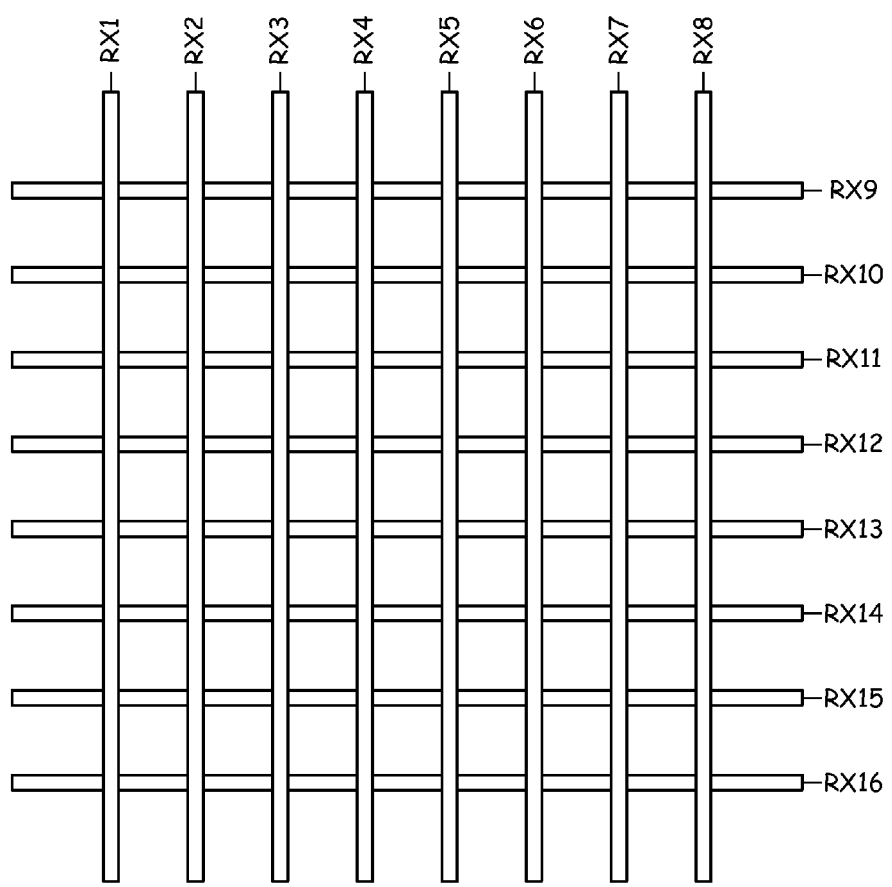
FIG. 17 is a diagram illustrating a touch pad during a second embodiment of hover mode operations according to one or more embodiments of the present invention.

FIG. 17 is a diagram illustrating a touch pad during a second embodiment of hover mode operations according to one or more embodiments of the present invention. With the operations of FIG. 17, the self capacitance of both the rows and columns is measured via respective RX signals. The sensitivity of receipt of the RX signals may be altered over time to enhanced received signal quality and to better determine the presence and location of one or more hovering or touching fingers (toes, feet, stylus, etc.). The relative sensitivity and noise disparity of RX signals of differing rows/columns may indicate the presence of a hovering object, e.g., finger, foot, stylus, etc.

Figure 18:
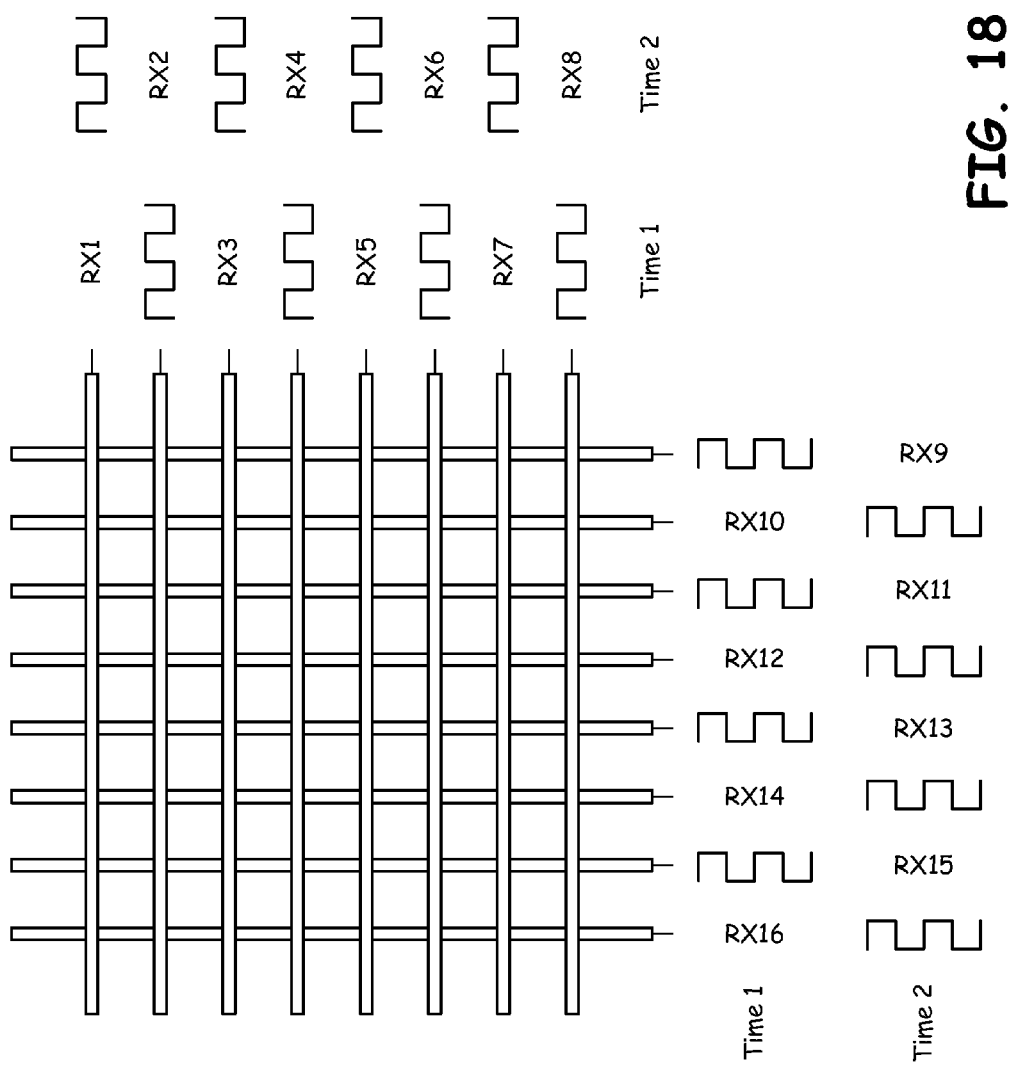
FIG. 18 is a diagram illustrating a touch pad during a third embodiment of hover mode operations according to one or more embodiments of the present invention.

FIG. 18 is a diagram illustrating a touch pad during a third embodiment of hover mode operations according to one or more embodiments of the present invention. With the embodiment of FIG. 18, every other row and column are energized with a TX signal during each time interval, e.g., T1, T2, etc. While such rows and columns are being energized with the TX signals, RX signals at the non-energized rows and columns are measured, indicating direct mutual capacitances of parallel rows and columns, which are strongly coupled. With the embodiment of FIG. 18, some or all of the TX signals may be orthogonal to one another to reduce unintended signal receipt.

Figure 19:
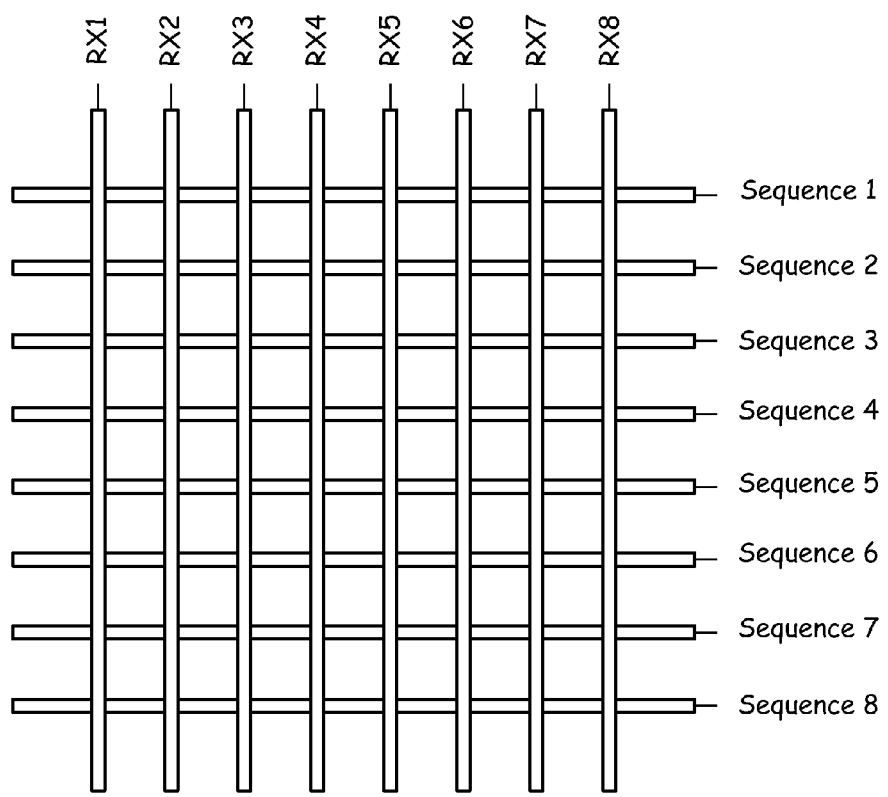
FIG. 19 is a diagram illustrating a touch pad during a fourth embodiment of hover mode operations according to one or more embodiments of the present invention.

FIG. 19 is a diagram illustrating a touch pad during a fourth embodiment of hover mode operations according to one or more embodiments of the present invention. With the embodiment of FIG. 19, a plurality of the columns is driven simultaneously with orthogonal TX signals, e.g., orthogonal sequences. The RX signal at each row is received and then operated upon so as to receive RX signal components for each TX signal. Thus, with eight orthogonal sequences transmitted on the eight columns, each RX signal would be covered upon receipt with eight differing orthogonal sequences to measure return of the eight respective TX signals (as RX signal components), similar to receipt of multiple CDMA reverse link signals at a CDMA base station. The received signals may be combined for each row in an attempt to localize indications of hovering objects.

With the embodiment of FIG. 19, good hover detection may be achieved with maximum RX SNR. TX signals may be doubled (or more) in voltage to increase sensitivity. Further, the scan rate may be slowed to allow for noise filtering and signal integration. The TX scan frequency may be increased during other operations.

FIGS. 20A-C are diagrams illustrating detecting a hovering finger or touching finger using zone-based active scan operations of an embodiment of touch pad operations according to one or more embodiments of the present invention. Referring to FIG. 20A, all columns are energized with TX signals and rows are scanned for RX signals. Such scanning may be done in a Time Division Multiplexed (TDM) fashion as was described with reference to FIG. 16 or 18 or may be done using a Code Division Multiplexed (CDM) technique described with reference to FIG. 19. In either case, once a hovering finger or touching finger is detected via operations of FIG. 20A, a binary search may be performed to find a zone in which the finger is hovering or touching. In one embodiment, four differing zones may be considered. The four zone approach works well for one touch. For multiple touch detection, more zone detections are preferred.

Once a first finger hover or touch is detected, other zones may be scanned, as is illustrated in FIGS. 20B and 20C. With the operation of FIG. 20B, columns 5-8 are energized with all rows scanned. With this operation, zones corresponding to columns 5-8 are considered for additional touches. Then, with the operation of FIG. 20C, columns 1-4 are energized with all rows scanned. With this operation, zones corresponding to columns 1-4 are considered for additional touches. Also, with the operation of FIG. 20C, the location of the already identified touch may be more accurately determined.

Figure 21B:
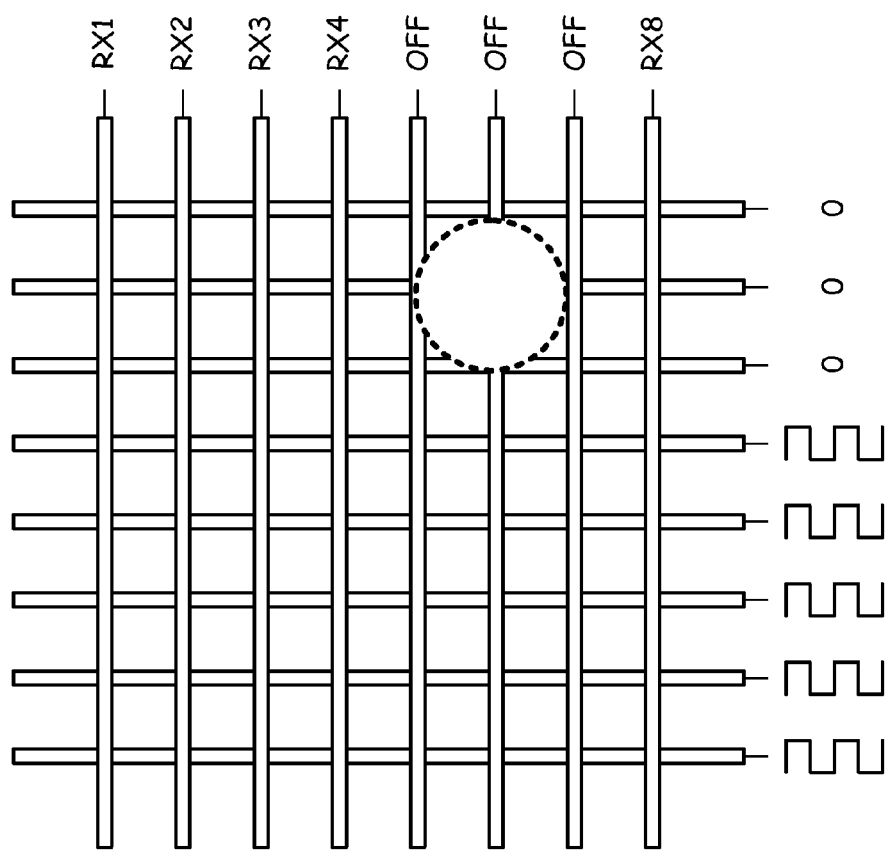

FIGS. 21A and 21B are diagrams illustrating detecting a hovering finger or touching finger using alternate zone-based active scan operations of an embodiment of touch pad operations according to one or more embodiments of the present invention. With the embodiment of FIG. 21A, a hovering or touching finger/toe/foot/stylus event is detected in a zone corresponding to rows 5, 6, and 7 and columns 1, 2, and 3. Then, sequentially in time, rows 1, 2, and 3 are driven with TX signals in a TDM fashion while rows 5, 6, and 7 are scanned for RX signals. The received RX signals or rows 5, 6, and 7 may be combined after processing or simply separately processed to determine better the X, Y, and Z position of the finger/toe/foot/stylus detected in the zone.

With the embodiment of FIG. 21B, TDM operations are employed for columns 4, 5, 6, 7, and 8, which correspond to other than the zone in which the hovering or touching finger/toe/foot/stylus is detected. According to one operation, the columns are energized with TX signals at the same time. In such case, the TX signals may be orthogonal to one other. With another operation, the columns are energized with TX signals in a TDM fashion.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip," as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A user input device comprising: a communications interface;
   a touch sensitive pad having a plurality of touch sensitive elements including:
   at least one central touch sensitive element with a first touch sensitive element value; and
   a set of touch sensitive elements located about the at least one central touch sensitive element, wherein each of the set of touch sensitive elements have a second touch sensitive element value being lower to that of the at least one central touch sensitive element; and
   processing circuitry coupled to the communications interface and to the touch sensitive pad, the processing circuitry operable to:
   scan the plurality of touch sensitive elements to measure a plurality of touch sensitive element values, which includes the first and the second touch sensitive element values;
   initially detect a hovering finger condition by comparing the plurality of touch sensitive element values to a hovering finger threshold pattern, the plurality of touch sensitive element values including the first touch sensitive element value of the at least one central touch sensitive element of the plurality of touch sensitive elements and, upon a favorable comparison to the hovering finger threshold pattern:
   alter a sensitivity of the set of the touch sensitive elements and the at least one central touch sensitive element;
   provide a distance value of the hovering finger condition relative to the touch sensitive pad; and provide a three-dimensional position based on the distance value of the hovering finger condition relative to the touch sensitive pad based at least in part upon a plurality of the second touch sensitive element values of the set of touch sensitive elements.

2. The user input device of claim 1, wherein the first and the second touch sensitive element values are selected from the group consisting of: touch sensitive element measured capacitance; touch sensitive element measured inductance; and touch sensitive element measured Radio Frequency (RF) impedance.

3. The user input device of claim 1, wherein the user input device comprises one of:
 a video game controller;
 a remote control;
 a vehicle data input device;
 a cellular telephone;
 a portable electronic device;
 a computer; and
 a keypad replacement device.

4. The user input device of claim 1, wherein upon the initial detection of the hovering finger condition the processing circuitry is further operable to adjust measuring sensitivity of the set of the touch sensitive elements to increase z-axis sensitivity by altering a first scanning frequency and/or a voltage to a second scanning frequency and/or voltage over time.

5. The user input device of claim 4, wherein the set of the touch sensitive elements reside about at least one touch sensitive element determined to be most proximate to the hovering finger condition.

6. The user input device of claim 1:
 further comprising a touch pad display coupled to the processing circuitry and corresponding to the touch sensitive pad, the touch pad display having a plurality of display elements configured to display at least one simulated button, each simulated button corresponding to a plurality of touch sensitive elements; and
 wherein upon determining the hovering finger condition, the processing circuitry is operable to cause the touch pad display to indicate partial depression of a simulated button proximate to the hovering finger.

7. The user input device of claim 6, wherein the processing circuitry is further operable to, upon determining the hovering finger condition, cause the touch pad display to indicate full depression of the simulated button.

8. The user input device of claim 1, wherein, to assist in detecting a hovering finger, the touch pad comprises:
 a first set of touch sensitive elements having first element constructs; and
 a second set of touch sensitive elements having second element constructs, the second element constructs differing from the first element constructs.

9. The user input device of claim 1, wherein the processing circuitry is further operable to transmit the position of the hovering finger in three-dimensions with respect to the touch sensitive pad to a remote device via the communications interface.

10. The user input device of claim 1, wherein the plurality of touch sensitive elements of the touch pad comprise one or more of:
 a plurality of capacitance detection touch sensitive elements interspersed with a plurality of Radio Frequency (RF) impedance detection touch sensitive elements;
 a plurality of inductance detection touch sensitive elements interspersed with a plurality of RF impedance detection touch sensitive elements; and
 a plurality of capacitance detection touch sensitive elements interspersed with a plurality of inductance detection touch sensitive elements.

11. A method for operating a user input device that has a communications interface, at least one touch sensitive pad having a plurality of touch sensitive elements, and processing circuitry coupled to the communications interface and to the at least one touch sensitive pad, the method comprising:
 scanning the plurality of touch sensitive elements to measure a plurality of touch sensitive element values;
 initially detecting a hovering finger condition by comparing the plurality of touch sensitive element values to a hovering finger threshold pattern, the plurality of touch sensitive element values including a first touch sensitive element value of at least one central touch sensitive element of the plurality of touch sensitive elements and including a second touch sensitive element value of each of a remainder of the plurality of touch sensitive elements, the second touch sensitive element value being lower to that of the at least one central touch sensitive element and, upon a favorable comparison to the hovering finger threshold pattern:
 altering a sensitivity of the plurality of touch sensitive elements;
 providing a distance value of the hovering finger condition relative to the touch sensitive pad; and
 providing a three-dimensional position based on the distance value of the hovering finger condition relative to the touch sensitive pad based at least in part upon the second touch sensitive element value of the each of the remainder of the plurality of touch sensitive elements.

12. The method of claim 11, wherein the user input device comprises one of:
 video game controller input;
 remote control input;
 vehicle data input device input;
 cellular telephone input;
 portable electronic device input;
 computer input; and
 keypad replacement device input.

13. The method of claim 11, further comprising, upon the initial detection of the hovering finger condition, adjusting measuring sensitivity of the plurality of the touch sensitive elements to increase z-axis sensitivity by altering a first scanning frequency and/or voltage to a second scanning frequency and/or voltage over time.

14. The method of claim 13, wherein the plurality of touch sensitive elements reside about at least one of another touch sensitive element determined to be most proximate to the hovering finger condition.

15. The method of claim 11, further comprising:
 operating a touch pad display of the user input device that corresponds to the touch sensitive pad to display at least one simulated button, each simulated button corresponding to a plurality of touch sensitive elements; and
 upon determining the hovering finger condition, causing the touch pad display to indicate partial depression of a simulated button proximate to the hovering finger.

16. The method of claim 15, further comprising, upon determining the touching finger condition after determining the hovering finger condition, causing the touch pad display to indicate full depression of the simulated button.

17. The method of claim 11, wherein scanning the plurality of touch sensitive elements to measure a plurality of touch sensitive element values comprises:
 receiving first touch sensitive element values from a first set of touch sensitive elements having first element constructs; and
 receiving second touch sensitive element values a second set of touch sensitive elements having second element constructs, the second element constructs differing from the first element constructs.

18. The method of claim 11, further comprising transmitting the position of the hovering finger in three-dimensions with respect to the touch sensitive pad to a remote device via the communications interface.

19. The method of claim 11, wherein scanning the plurality of touch sensitive elements to measure a plurality of touch sensitive element values comprises one of:
measuring capacitance of a first set of touch sensitive elements and measuring RF impedance of a second set of touch sensitive elements that are interspersed with the first set of touch sensitive elements;
measuring inductance of a first set of touch sensitive elements and measuring RF impedance of a second set of touch sensitive elements that are interspersed with the first set of touch sensitive elements; and
measuring capacitance of a first set of touch sensitive elements and measuring inductance of a second set of touch sensitive elements that are interspersed with the first set of touch sensitive elements.

20. A method for operating a user input device that has a communications interface, the method comprising:
scanning a plurality of touch sensitive elements of a touch sensitive pad to measure a plurality of touch sensitive element values;
initially detecting a hovering finger condition by comparing the plurality of touch sensitive element values to a hovering finger threshold pattern, the plurality of touch sensitive element values including a first touch sensitive element value of at least one central touch sensitive element of the plurality of touch sensitive elements and including a second touch sensitive element value of each of a remainder of the plurality of touch sensitive elements, the second touch sensitive element value being lower to that of the at least one central touch sensitive element and, upon a favorable comparison to the hovering finger threshold pattern:
altering a sensitivity of the plurality of touch sensitive elements;
providing a distance value of the hovering finger condition relative to the touch sensitive pad; and
providing a three-dimensional position based on the distance value of the hovering finger condition relative to a plane of the touch sensitive pad based at least in part upon a set of the second touch sensitive element values of the remainder of the plurality of touch sensitive elements located about the at least one central touch sensitive element.

* * * * *